United States Patent [19]

Kozaki et al.

[11] Patent Number: 5,124,824
[45] Date of Patent: Jun. 23, 1992

[54] LIQUID CRYSTAL DISPLAY DEVICE COMPRISING A RETARDATION COMPENSATION LAYER HAVING A MAXIMUM PRINCIPAL REFRACTIVE INDEX IN THE THICKNESS DIRECTION

[75] Inventors: Shuichi Kozaki; Hiroshi Ohnishi, both of Nara; Toshiyuki Yoshimizu, Kyoto, all of Japan

[73] Assignee: Mitsubishi Denki Kabushiki Kaisha, Tokyo, Japan

[21] Appl. No.: 446,305

[22] Filed: Dec. 5, 1989

[30] Foreign Application Priority Data

Dec. 7, 1988 [JP] Japan ................. 63-310893
Oct. 13, 1989 [JP] Japan ................. 1-267235

[51] Int. Cl.⁵ ............................................ G02F 1/133
[52] U.S. Cl. .......................................... 359/73; 359/53; 359/93; 359/63
[58] Field of Search ............. 350/335, 337, 339 R, 350/347 E, 347 R

[56] References Cited

U.S. PATENT DOCUMENTS

| | | | |
|---|---|---|---|
| 4,385,806 | 5/1983 | Fergason | 350/332 |
| 4,443,065 | 4/1984 | Funada et al. | 350/335 |
| 4,586,790 | 5/1986 | Umeda et al. | 350/337 |
| 4,592,623 | 6/1986 | Yamamoto et al. | 350/337 |
| 4,701,028 | 10/1987 | Clerc et al. | 350/335 |
| 4,767,190 | 8/1988 | Dir et al. | 350/334 |
| 4,813,770 | 3/1989 | Clerc et al. | 350/335 |
| 4,852,976 | 8/1989 | Suzuki | 350/337 |
| 4,889,412 | 12/1989 | Clerc et al. | 350/347 E |
| 4,906,073 | 3/1990 | Hunahata et al. | 350/335 |
| 4,909,606 | 3/1990 | Wada et al. | 350/335 |
| 4,957,349 | 9/1990 | Clerc et al. | 359/63 |
| 4,984,873 | 1/1991 | Takiguchi et al. | 350/337 |
| 5,016,988 | 5/1991 | Iimura | 359/63 |
| 5,039,185 | 8/1991 | Uchida et al. | 359/93 |
| 5,056,896 | 10/1991 | Iimura et al. | 359/63 |

FOREIGN PATENT DOCUMENTS

| | | |
|---|---|---|
| 315484 | 5/1989 | European Pat. Off. |
| 63-271415 | 11/1988 | Japan |
| 63-271429 | 11/1988 | Japan |
| 1-219720 | 9/1989 | Japan |
| 1243019 | 9/1989 | Japan |
| 2-047629 | 2/1990 | Japan |
| 1462978 | 1/1977 | United Kingdom ............ 350/347 R |

Primary Examiner—Stanley D. Miller
Assistant Examiner—Tai V. Duong

[57] ABSTRACT

There is disclosed a liquid crystal display device including a liquid crystal display cell layer and a pair of polarizers arranged on the sides of respective outer surfaces of the display cell layer. The liquid crystal display device further includes a retardation compensation layer having an optical birefringence which is arranged on at least one side, in a direction of the thickness of the display cell layer and between the polarizers, which compensates a change in the retardation caused when light passes through the display cell layer so as to improve viewing angle characteristics. A direction of a maximum one of principal refractive indices of the retardation compensation layer is oriented in a direction substantially parallel to a direction of the normal perpendicular to the surfaces of transparent substrates of the display cell layer.

17 Claims, 18 Drawing Sheets

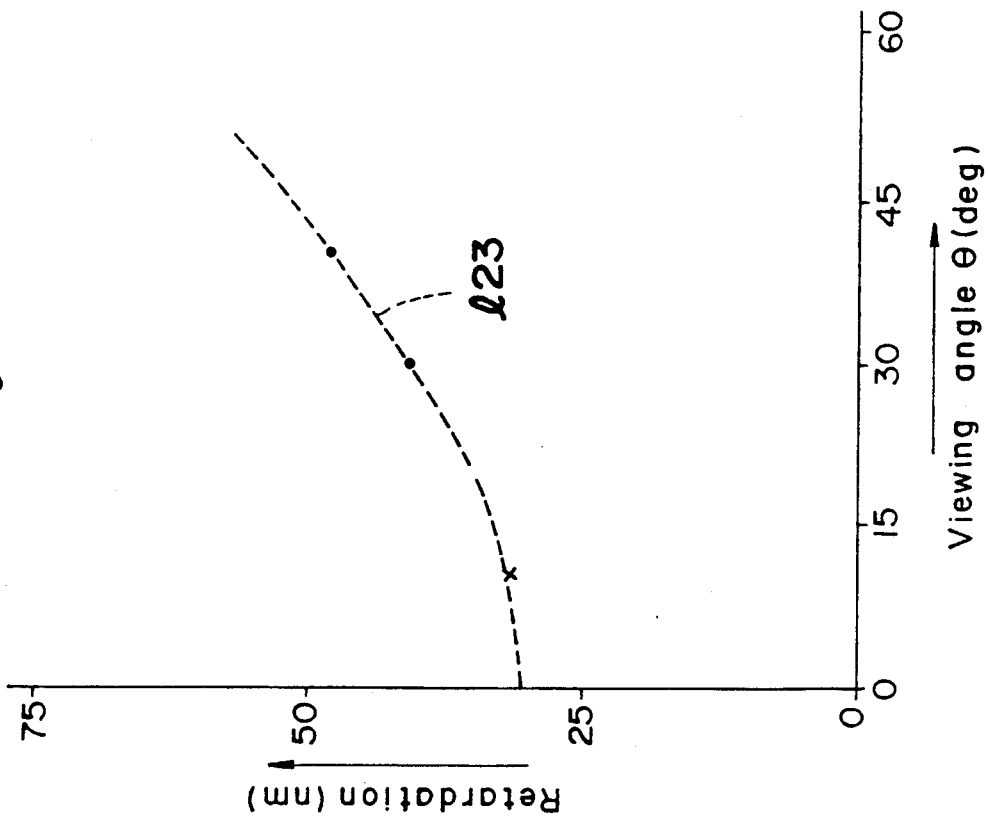
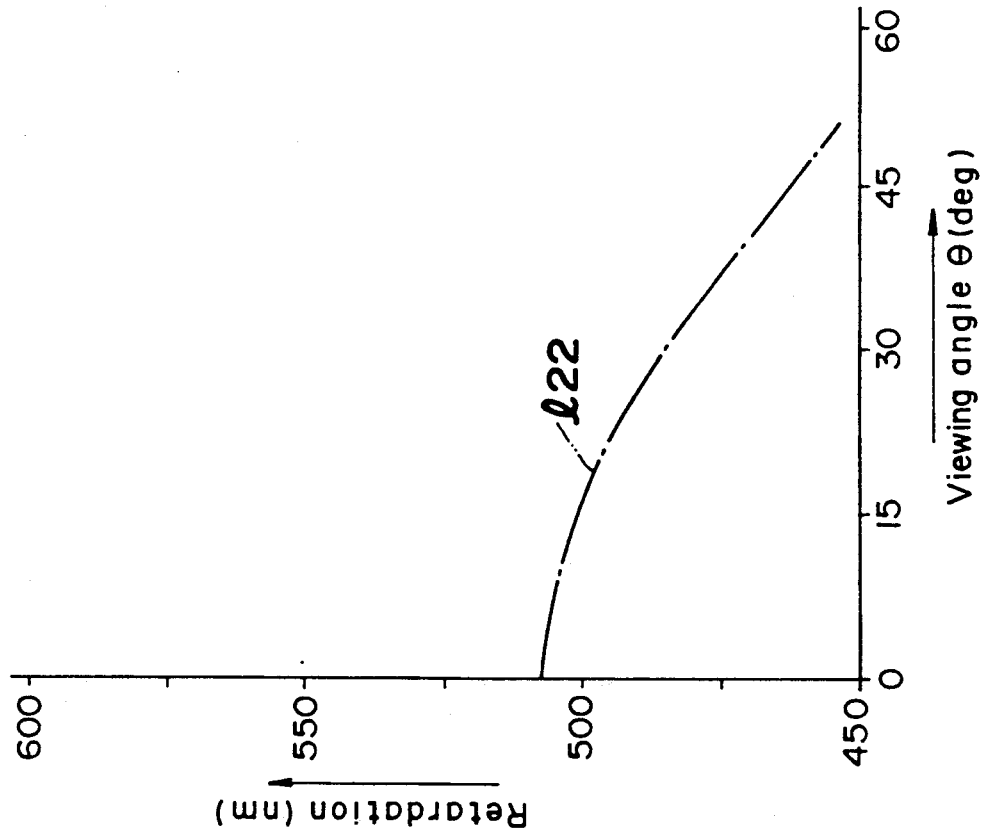

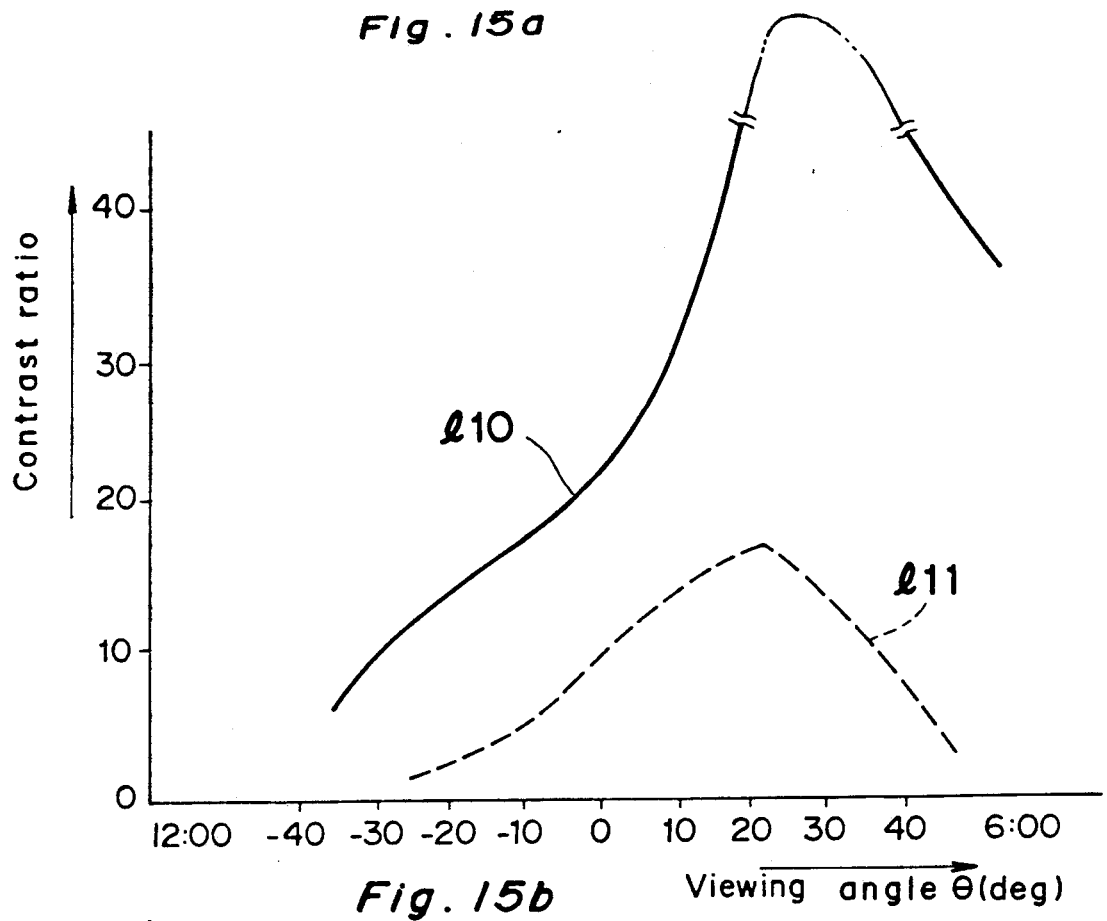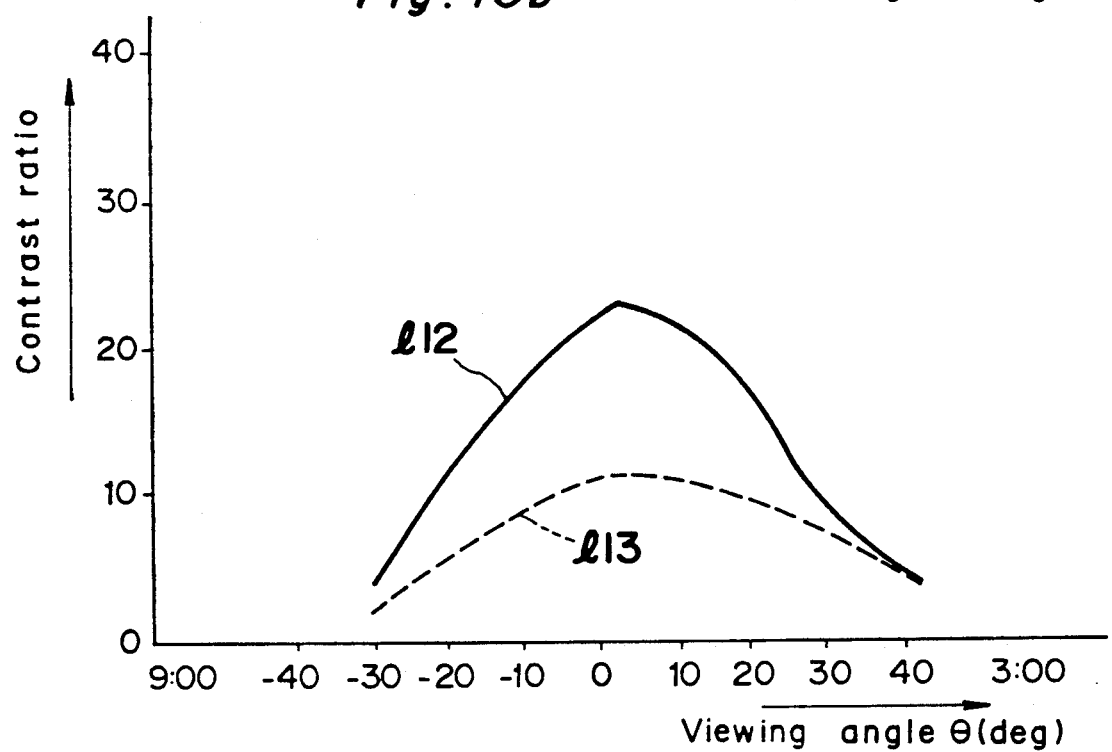

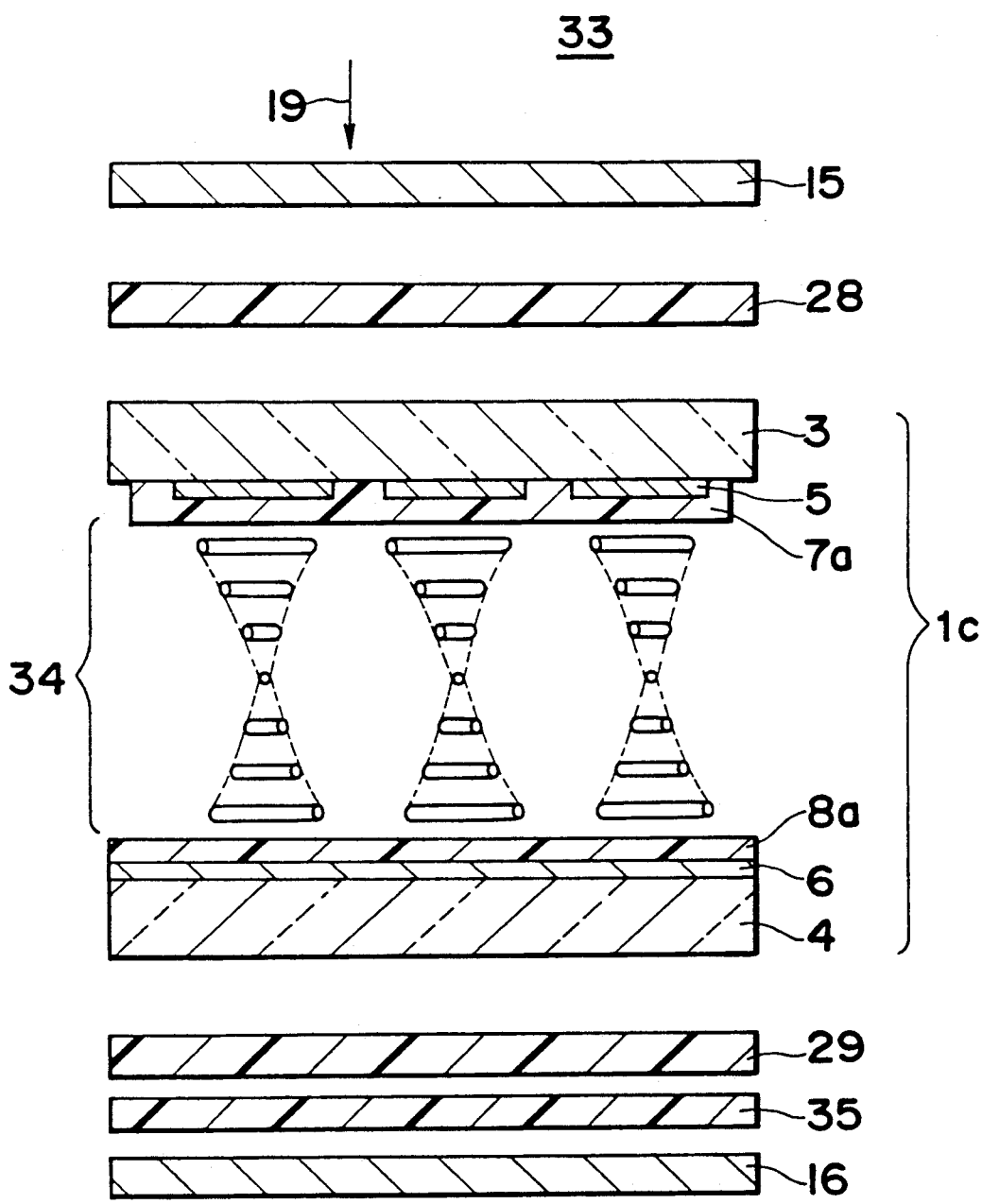

LIQUID CRYSTAL DISPLAY DEVICE COMPRISING A RETARDATION COMPENSATION LAYER HAVING A MAXIMUM PRINCIPAL REFRACTIVE INDEX IN THE THICKNESS DIRECTION

BACKGROUND OF THE INVENTION

1. Field of the Invention

The present invention relates to a liquid crystal display device, and more particularly, to a liquid crystal display device comprising improved viewing angle characteristics.

2. Description of Related Art

Conventionally, liquid crystal display devices have been widely used in numerical segment type display devices such as displays of clocks and electronic calculating machines, so as to make the best use of features thereof such as thin configuration, lightness, and low power consumption.

Recently, in order to display much more information thereon, a matrix type display method has been adopted in liquid crystal display devices. In a matrix type liquid crystal display device utilizing this method, respective pixels thereof are selectively driven so as to display an image on the liquid crystal device. Liquid crystal display devices of this type have been utilized as displays of office automation apparatuses such as personal computers, word processors, copying machines etc..

Furthermore, in order to satisfy high demands for not only displaying information more densely and making a display size larger, such as five inches or more, but also displaying various kinds of information, various kinds of color display methods have been used for a color liquid crystal display device capable of displaying a color image thereon in addition to a monochromatic image.

Up to now, the following methods (a) to (d) have been proposed mainly as a display method for color liquid crystal display devices.

(a) A display method using a guest-host effect type liquid crystal display device for displaying a two-color image thereon using absorption of the incident light. In this method, dye for enabling light of different color to pass therethrough depending on an orientation direction of dye molecules is mixedly added to the liquid crystal so as to allow the orientation direction of the dye molecules to follow a change in the orientation direction of the liquid crystal, resulting in a two-color display.

(b) A display method for a color image on a liquid crystal display device constituted by combination of a twisted nematic liquid crystal cell and a color polarizer.

(c) A display method utilizing an electrically controlled birefringence type liquid crystal display device for displaying a color image thereon using a change in the birefringence of the liquid crystal according to an electric field applied thereto.

(d) A display method for displaying a color image on a liquid crystal display device comprising color filter layers of red color, green color, blue color etc. in addition to a liquid crystal layer, by utilizing the liquid crystal layer as a light shutter.

Particularly, the aforementioned display method (d) has such an advantage that a full color image can be displayed in a matrix form in a high contrast, and is one of the display methods to which attention is paid the most at present. In this display method, an active drive type twisted nematic liquid crystal display method (referred to as an active drive type TN liquid display device hereinafter), and a multiplex drive type Super Twisted Nematic liquid crystal display method are normally used (referred to as a multiplex drive type STN liquid crystal display method hereinafter). In the active drive type TN liquid crystal display method, active devices such as thin film transistors are formed as switching means for selecting respective pixels of the liquid crystal display device, and the liquid crystal is twisted at an angle of 90°. On the other hand, the multiplex drive type STN liquid crystal display method utilizes steepness of light transmittance characteristics on an applied voltage obtained when a twist angle of the liquid crystal is set at an angle equal to or larger than 90°.

Furthermore, the active drive type TN liquid crystal display method is classified mainly into the following two methods depending on a method for arranging a pair of polarizers. One is a normally black method for displaying a black color image on a liquid crystal display device in an OFF state of a liquid crystal layer, namely, in such a state that no voltage is applied thereto. This is done arranging a pair of polarizers on both surfaces of the liquid crystal layer so that the polarization axes of the polarizers become substantially parallel to each other. Another is a normally white method for displaying a white color image on a liquid crystal display device in the aforementioned OFF state of the liquid crystal layer, by arranging a pair of polarizers on both surfaces of the liquid crystal layer so that the polarization axes of the polarizers cross each other at right angles. Particularly, the normally white method is superior to the normally black method in a display characteristics such as a display contrast, color reproductivity, and display characteristics depending on a viewing angle.

Furthermore, in the multiplex drive type STN liquid crystal display method, an optical compensation film addition type display method is mainly used, utilizing light shutter effect in a white/black display having a small dependency on the wavelength of light. The display method of this type is classified into a Double Super Twisted Nematic liquid crystal display method (referred to as a DSTN liquid crystal display method hereinafter) utilizing a liquid crystal cell as the optical compensation film wherein the liquid crystal is twisted at a twist angle in a direction opposite to that of a liquid crystal display cell, and a film addition type liquid crystal display method utilizing a film having optical anisotropy. Among those methods, it is supposed from a point of view of lightness, that the film addition type liquid crystal display method will be mainly used.

FIG. 1 is an exploded cross sectional view showing a conventional twisted nematic type liquid crystal display device 17.

As shown in FIG. 1, the liquid crystal display device 17 comprises a liquid crystal cell layer 1 containing a liquid crystal layer 13 therein. In the liquid crystal layer 13, liquid crystal molecules are arranged in a twisted nematic phase. The cell layer 1 has such a structure that the liquid crystal layer 13 is contained between a pair of optically transparent glass substrates 3 and 4 which oppose each other.

Further, optically transparent electrode films 5 and 6 for applying a voltage to the liquid crystal layer 13 are formed on respective inner surfaces of the optically transparent substrates 3 and 4, wherein the electrode films 5 and 6 are made of Indium Tin Oxide (referred to as ITO hereinafter), which is made of indium oxide to which tin is added. Further, and each of the electrode films 5 and 6 has patterns composed of plural strips which are parallel to each other so that each longitudinal direction of the strips of the optically transparent electrode film 5 solidly crosses that of the optically transparent electrode film 6 at right angles in a manner well known by those skilled in the art, resulting in plural pixels located at respective crossings in a matrix form. Furthermore, orientation membranes 7 and 8 are formed on respective inner surfaces of the electrode films 5 and 6, wherein respective surfaces of the orientation membranes 7 and 8 are previously treated by rubbing with cloth a so that the liquid crystal of the liquid crystal layer 13 is twisted at an angle of 90° between the optically transparent substrates 3 and 4, as schematically shown in FIG. 1. The optically transparent substrates 3 and 4 of the cell layer 1 are bonded by a sealing element (not shown) of a resin so that the liquid crystal layer 14 is sealed therein, resulting in a completely constructed cell layer 1.

Further, on the outer surfaces of the optically transparent substrates 3 and 4, a pair of polarizers 15 and 16 are formed so that the polarization axes of the polarizers 15 and 16 cross each other at right angles as indicated by arrows 20 and 21, respectively.

Furthermore, a driving circuit (not shown) comprising a regulated voltage power source is connected to the electrode films 5 and 6, and the regulated voltage power source applies a predetermined voltage selectively to the pixels located at the crossings between respective strips of the electrode films 5 and 6 so as to change the orientation state of the liquid crystal of the liquid crystal layer 13.

For example, in the case that no voltage is applied between the electrode films 5 and 6, when light radiated from a light source is incident onto the liquid crystal display device 17 in a direction substantially perpendicular to the outer surface of the polarizer 15 as indicated by an arrow 19, only light having the polarization direction parallel to the polarization direction of the polarizer 15 as indicated by the arrow 20 is enabled by the polarizer 15 to pass therethrough. Namely, linearly polarized light having the polarization direction passes through the polarizer 15, and is incident onto the liquid crystal layer 13. Then, the polarization axis thereof is rotated at an angle of 90° by the liquid crystal layer 13, the liquid crystal of which is twisted at an angle of 90°. Thereafter, the linearly polarized light is incident onto the polarizer 16. As described above, the polarization direction of the polarizer 16 crosses the polarization direction 20 of the polarizer 15 at a right angle. Namely, it is perpendicular to the surface of FIG. 1 as indicated by the arrow 21. Therefore, the linearly polarized light, having passed through the cell layer 1, passes through the polarizer 16.

On the other hand, in the case that a predetermined voltage is applied between the electrode films 5 and 6, the liquid crystal of the liquid crystal layer 13 is not twisted. Therefore, the polarization direction of the light incident onto the liquid crystal layer 13 is not rotated. Then, the incident light is shaded by the polarizer 16 so as not to pass therethrough since the polarization direction of the light incident from the liquid crystal layer 13 onto the polarizer 16 is perpendicular to that of the polarizer 16 as indicated by the arrow 21.

FIG. 2 is a perspective view for defining a viewing angle $\theta$ which is used in the experiment of the conventional device 17 as described below and the experiment of a liquid crystal display device 18 of the preferred embodiment described in detail later.

Generally, the liquid crystal display device 17 has a specific direction 22 in which the display contrast becomes a maximum value. Above a surface 17a of the optically transparent glass substrate of the liquid crystal display device, there is defined a plane 24 including a normal 23 perpendicular to the surface 17a and extending from a point P defined on the surface 17a, and a line 22a on the surface 17a extending from the point P in a direction parallel to the direction 22 in which the display contrast becomes a maximum value. An angle at which the normal 23 crosses a line 25 of sight on the plane 24 is called a viewing angle $\theta$. Namely, the viewing angle $\theta$ is an elevation angle at which a user watches a liquid crystal display device.

FIG. 3 shows light transmittance characteristics on an applied voltage of the liquid crystal display device 17 shown in FIG. 1, with a parameter of the viewing angle $\theta$, which are obtained by the measurement performed by the inventors of the present invention. In FIG. 3, a characteristic curve 11 shows the characteristic in the case of a viewing angle of 0°, and a characteristic curve 12 shows the characteristic in the case of any viewing angle larger than 0°.

As is apparent from FIG. 3, in the case of the viewing angle $\theta > 0°$, the light transmittance becomes about zero % at the application of a voltage of about 2.5 V,. However, a rising phenomenon of the light transmittance is caused such that the light transmittance increases again at the application of a voltage in the range from about 3 V to about 4 V, wherein the peak value of the light transmittance is indicated by "T$\theta$peak" hereinafter.

FIG. 4 shows a relationship between the viewing angle $\theta$ and the peak value T$\theta$peak of the light transmittance of the liquid crystal display device 17.

As shown in FIG. 4, generally, the peak value T$\theta$peak is about zero in the case of a viewing angle of 0°. However, the peak value T$\theta$peak increases as the viewing angle $\theta$ increases so as to have a positive correlation therebetween in the case of a viewing angle $\theta > 0°$. Due to this, in the case of a viewing angle $\theta > 0°$ wherein the rising phenomenon of the light transmittance is caused, the gradation is inverted upon displaying an image on the conventional liquid crystal display device 17 since the peak value T$\theta$peak of the light transmittance becomes sufficiently larger than zero %. Particularly, in a color display using a color liquid crystal display device in which it is necessary to display a color image thereon so as to have a predetermined gradation, predetermined colors of an image to be displayed cannot be displayed thereon since the peak value T$\theta$peak is not zero, resulting in inversion of the gradation. Therefore, in order to obtain a liquid crystal display device having excellent light transmittance characteristics depending on the viewing angle $\theta$, it is necessary to cancel the peak value T$\theta$peak of the light transmittance.

The applicant of the present invention proposed preferable numerical requirements of parameters for effectively canceling the aforementioned peak value T$\theta$peak of the light transmittance in the Japanese patent laid open publication (JP-A) No. 1-243019/1989.

The proposed numerical requirements (a) to (c) of parameters are as follows.

(a) A retardation Δn·d which is the product of a birefringence Δn representing the anisotropy of the refractive index of the liquid crystal and a thickness d of the liquid crystal cell is preferably set so as to fall in the following range.

$$0.3 \ \mu ms \leq \Delta n \cdot d \leq 0.6 \ \mu ms. \quad (1)$$

wherein
wherein $\Delta n = n_3 - n_0$,
$n_e$ is a refractive index in a direction of the principal axis of each liquid crystal molecule contained in the liquid crystal cell, and
$n_0$ is a refractive index in a direction perpendicular to a direction of the principal axis of each liquid crystal molecule therein.

(b) A ratio $K_{33}/K_{11}$ of a bend elastic constant $K_{33}$ to a spray elastic constant $K_{11}$ of the liquid crystal is preferably set at a value equal to or smaller than about 1.0.

(c) A ratio $K_{33}/K_{22}$ of the bend elastic constant $K_{33}$ to a twist elastic constant $K_{22}$ of the liquid crystal is preferably set at a value equal to or larger than about 2.0.

FIG. 5 shows a relationship between the ratios $K_{33}K_{11}$ and $K_{33}/K_{22}$ when a composition ratio of a liquid crystal material used in a twisted nematic type liquid crystal display device is changed. In FIG. 5, "×" represents the aforementioned relationship based on the results obtained by the measurement performed by the inventors of the present invention.

As is apparent from FIG. 5, the following characteristics similar to that known in those skilled in the art are obtained. Generally, it is understood that there is a positive correlation between ratios $K_{33}/K_{11}$ and $K_{33}/K_{22}$. Therefore, it is difficult to set the ratio $K_{33}/K_{11}$ at a value equal to or smaller than 1.0 and to set the ratio $K_{33}/K_{22}$ at a value equal to or larger than 2.0 as described above, because of the positive correlation shown in FIG. 5. Due to this, it is impossible to sufficiently decrease the peak value Tθpeak of the light transmittance. Furthermore, in order to satisfy demand for making the display size larger, it is necessary to set the peak value Tθpeak at a value equal to or smaller than about 3.0%, taking the visual characteristic of human being into consideration statistically.

FIG. 6 is an exploded cross sectional view of a conventional STN type liquid crystal device 26 for displaying a monochromatic image composed of white and black images by utilizing a pair of optical films 28 and 29 for canceling a phase difference between respective phases of ordinary light and extraordinary light which may generate in the liquid crystal layer. The optical films 28 and 29 for canceling the phase difference is referred to as phase difference cancellation films hereinafter. In FIG. 6, the components similar to that shown in FIG. 1 are represented by the same numerical references as that shown in FIG. 1.

In the liquid crystal display device 26, optically transparent electrode films 5 and 6 of ITO having the predetermined patterns are formed on respective inner opposing surfaces of a pair of optically transparent glass substrates 3 and 4 in the manner similar to that of the conventional liquid crystal device 17 shown in FIG. 1. Further, orientation membranes 7a and 8a are formed on respective inner surfaces of the optically transparent electrode films 5 and 6. A liquid crystal layer 27 is contained between a pair of optically transparent substrates 3 and 4, and these optically transparent substrates 3 and 4 are bonded by a sealing element (not shown) of a resin, so that the liquid crystal layer 27 is sealed therein.

Respective surfaces of the orientation membranes 7a and 8a are previously treated by rubbing with cloth, so that liquid crystal of the liquid crustal layer 27 is twisted at an angle in the range between 180° and 260°, namely, liquid crystal molecules thereof are arranged in a super twisted nematic phase.

Further, on respective outer surfaces of the optically transparent substrates 3 and 4, there are formed a pair of phase difference cancellation films 28 and 29 of a uniaxially drawn polymeric film having a predetermined optical axis. Furthermore, on respective outer surfaces of the phase difference cancellation films 28 and 29, a pair of polarizers 15 and 16 are formed in the manner similar to that of the conventional liquid crystal display device 17 shown in FIG. 1, resulting in the STN liquid crystal display device 26.

Normally, in the STN type liquid crystal display device, the birefringence thereof becomes relatively large by the aforementioned super twist of the liquid crystal, and incident light having passed through the liquid crystal display device is colored with a yellow green color in a so-called yellow green mode, or with a blue color in a so-called blue mode. In order to prevent the incident light from being colored so as to improve the visibility, there has been developed the STN type liquid crystal display device for displaying a monochromatic image composed of white and black images thereon by arranging a pair of optical phase difference cancellation films 28 and 29.

The STN type liquid crystal display device 26 for displaying a monochromatic image thereon by utilizing the optical phase difference cancellation films 28 and 29 has a relatively large display capacity since it is capable of being driven using a time division method at a relatively high frequency. Further, it is capable of displaying a monochromatic image composed of white and black images thereon in a relatively high contrast, resulting in a distinct display. Furthermore, since the STN type liquid crystal display device 26 becomes capable of displaying a color image thereon by arranging color filter layers, it has been utilized as displays of personal computers, word processors etc.. However, since the STN type liquid crystal display device 26 has a relatively large dependency of light transmittance on the viewing angle 8 which is the elevation angle at which the user watches the liquid crystal display device 26, it has such a disadvantage that viewing angle characteristics thereof is inferior to the other type liquid crystal display devices.

SUMMARY OF THE INVENTION

An essential object of the present invention is to provide a liquid crystal display device which is capable of displaying an image thereon of high quality over a wide range of the viewing angle.

Another object of the present invention is to provide a liquid crystal display device which is capable of displaying a color image thereon without inversion of the gradation.

In order to accomplish the aforementioned objects, according to one aspect of the present invention, there is provided a liquid crystal display device comprising:
a display cell layer for displaying an image thereon, said display cell layer containing a liquid crystal layer arranged between a pair of optically transparent substrates;

a pair of polarizers arranged on the sides of respective outer surfaces of said display cell layer; and retardation compensation layer having an optical birefringence for compensating a change in the retardation caused when light passes through said display cell layer so as to improve viewing angle characteristics, said retardation compensation layer being arranged on at least one side and in a direction of the thickness of said display cell layer and between said pair of polarizers; and a direction of a maximum one of principal refractive indices of said retardation compensation layer is oriented in a direction substantially parallel to a direction of the normal perpendicular to the surfaces of the pair of optically transparent substrates of said display cell layer.

According to another aspect of the present invention, there is provided a liquid crystal display device comprising:

a display cell layer for displaying an image thereon, said display cell layer containing a liquid crystal layer arranged between a pair of first and second optically transparent substrates;

first and second polarizers arranged on the sides of respective outer surfaces of said display cell layer;

first and second phase difference cancellation films for canceling a phase difference between ordinary light and extraordinary light generated by an optical birefringence of said display cell layer, said first phase difference cancellation film being arranged between said first optically transparent substrate and said first polarizer, said second phase difference cancellation film being arranged between said second optically transparent substrate and said second polarizer; and retardation compensation layer having an optical birefringence for compensating a change in the retardation caused when light passes through said display cell layer so as to improve viewing angle characteristics, said retardation compensation layer being arranged on at least one side and in a direction of the thickness of said display cell layer, and between said first and second polarizers, wherein a direction of a maximum one of principal refractive indices of said retardation compensation layer is oriented in a direction substantially parallel to a direction of the normal perpendicular to the surfaces of the pair of first and second optically transparent substrates of said display cell layer.

In the liquid crystal display device comprising the liquid crystal display cell layer and a pair of polarizers, a change in the retardation caused when light passes through the liquid crystal display cell layer is set to be substantially equal to that caused when light passes through the retardation compensation layer, over the viewing angle $\theta$ giving the maximum peak value T$\theta$peak of the light transmittance. The change in the retardation caused in the display cell layer is substantially proportional to a phase difference between respective phases of two kinds of lights including ordinary and extraordinary lights transmitting the liquid crystal display cell layer having an optical anisotropy.

After passing through one polarizer, the incident light becomes linearly polarized light. Thereafter, when the linearly polarized light passes through the liquid crystal layer, ordinary light and extraordinary light may generate due to the optical birefringence of the liquid crystal display layer, and the linear polarized light may become elliptically polarized light corresponding to the phase difference between respective phases of the ordinary light and the extraordinary light. According to the present invention, the retardation compensation layer, having the optical birefringence, cancels the phase difference, so that the light having passed therethrough becomes linearly polarized light.

That is, generally, the retardation for the light having passed through the display cell layer decreases as the viewing angle $\theta$ increases. Therefore, the retardation compensation layer, having such a characteristic that the retardation for the light passing therethrough increases as the viewing angle $\theta$ increases, is overlapped on the display cell layer so as to offset a change in the retardation for the light passing through the display cell layer, and to cancel the phase difference therebetween.

Therefore, the peak value T$\theta$peak of the light transmittance of the liquid crystal display device according to the present invention can be canceled over almost the whole range of the viewing angle $\theta$ at which the user views an image displayed on the liquid crystal display device, and inversion of the gradation upon displaying an image thereon can be prevented. Furthermore, particularly, when the present invention is applied to a color liquid crystal display device for displaying an image having a predetermined gradation thereon, a state of inversion of the gradation can be prevented, for example, such that predetermined colors of the image to be displayed are not displayed thereon. Therefore, according to the present invention, there is provided a liquid crystal display device capable of displaying an image thereon with an improved display quality.

BRIEF DESCRIPTION OF THE DRAWINGS

These and other objects and features of the present invention will become clear from the following description taken in conjunction with the preferred embodiments thereof with reference to the accompanying drawings, in which:

FIG. 11 is a graph showing a retardation characteristic on the viewing angle of a first cell layer of the liquid crystal display device shown in FIG. 7;

FIG. 12 is a graph showing a retardation characteristic on the viewing angle of a second cell layer of the liquid crystal display device shown in FIG. 7;

FIGS. 15a and 15b are graphs showing contrast ratio characteristics on the viewing angle of the liquid crystal display device shown in FIG. 13 and the conventional liquid crystal display device shown in FIG. 1;

FIG. 16 is an exploded cross sectional view showing a liquid crystal display device of a third preferred embodiment according to the present invention;

DETAILED DESCRIPTION OF THE PREFERRED EMBODIMENT

Preferred embodiments according to the present invention will be described below with reference to the attached drawings.

First Preferred Embodiment

Figure 1:
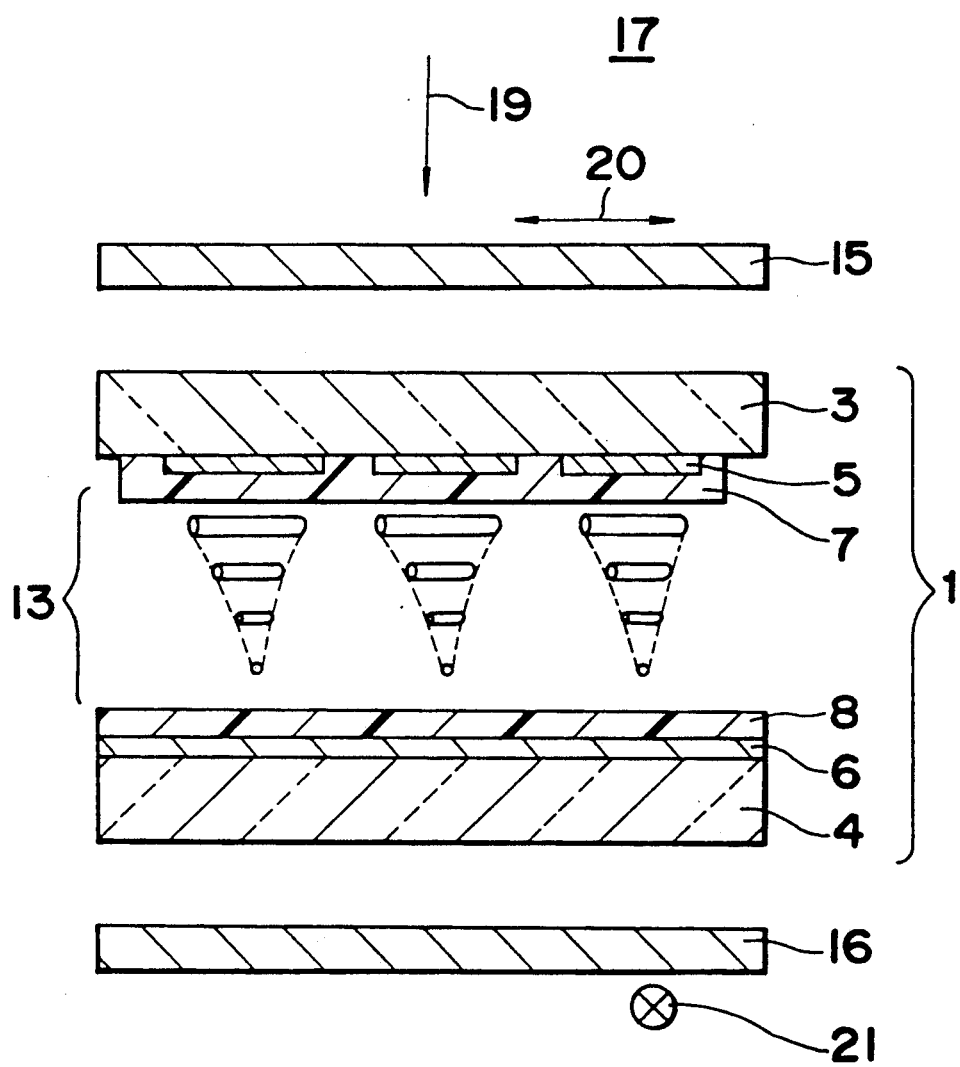
FIG. 1 is an exploded cross sectional view showing a conventional twisted nematic type liquid crystal display device.
Figure 2:
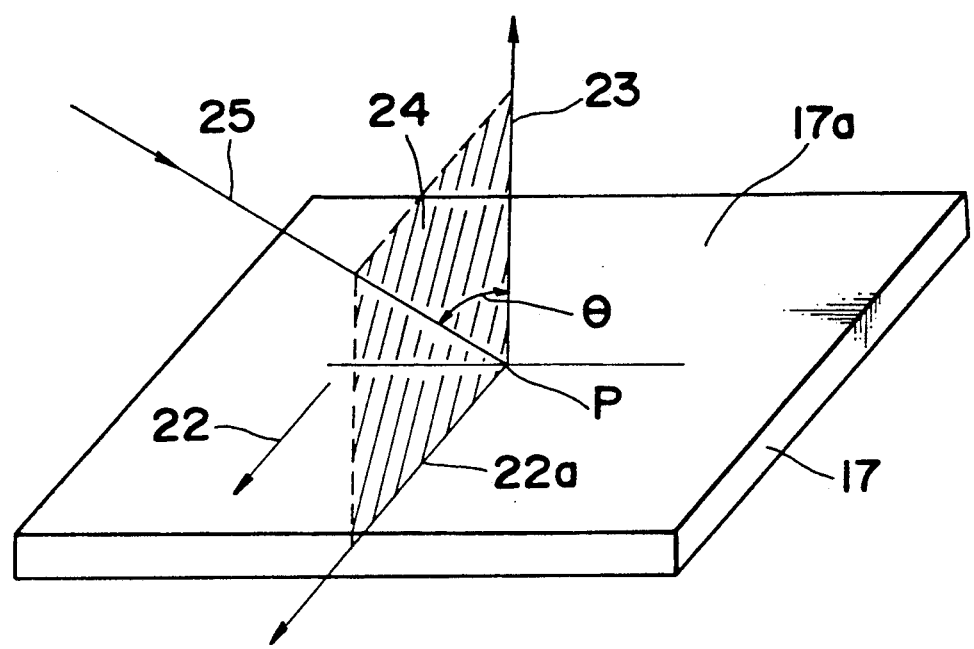
FIG. 2 is a perspective view for defining a viewing angle.
Figure 3:
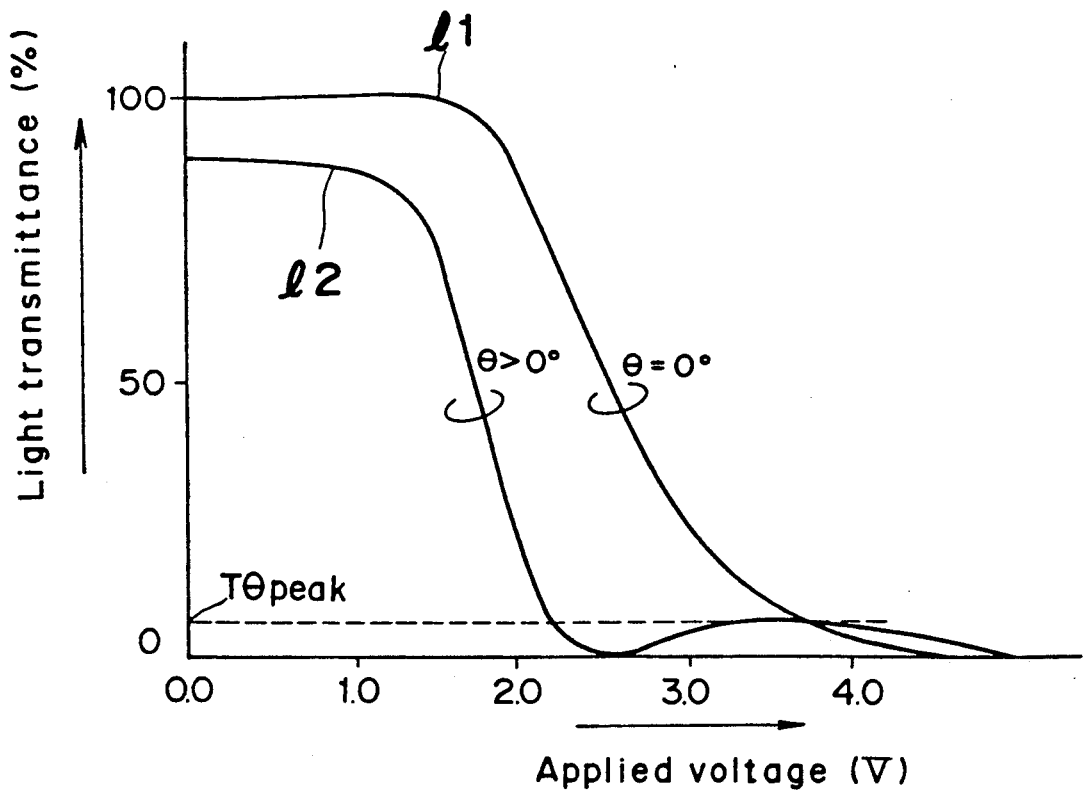
FIG. 3 is a graph showing light transmittance characteristics on an applied voltage of the conventional liquid crystal display device shown in FIG. 1.
Figure 4:
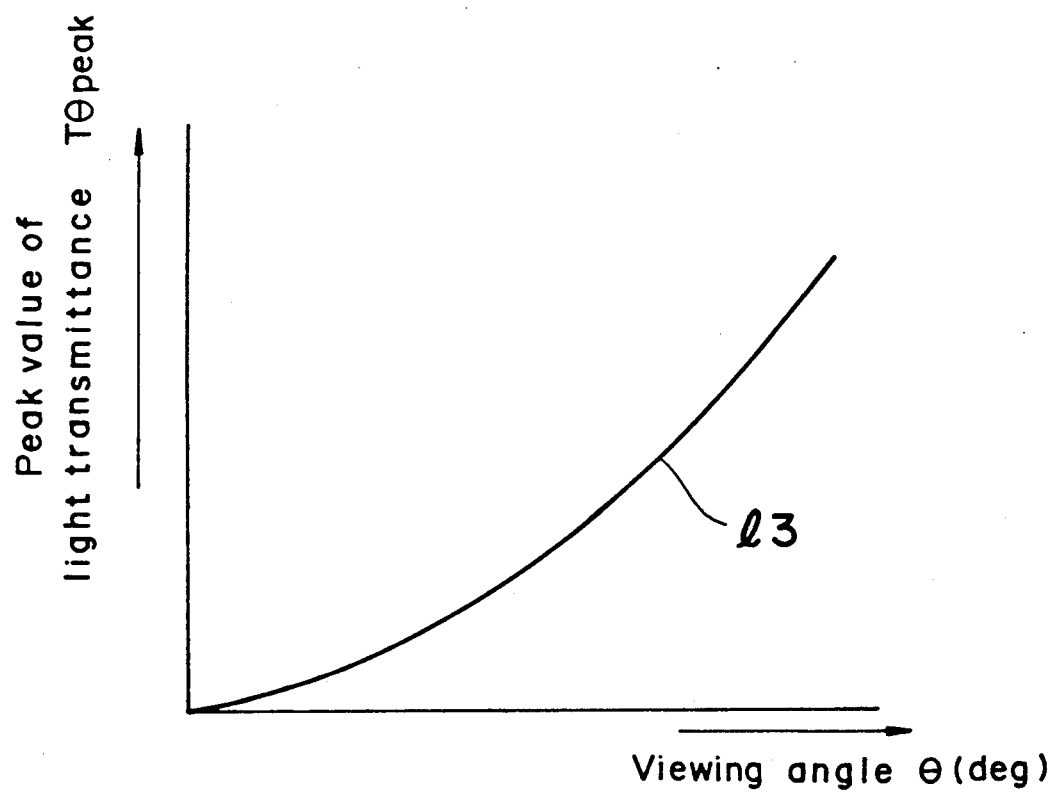
FIG. 4 is a graph showing a relationship between the viewing angle $\theta$ and a light transmittance in the liquid crystal display device shown in FIG. 1.
Figure 5:
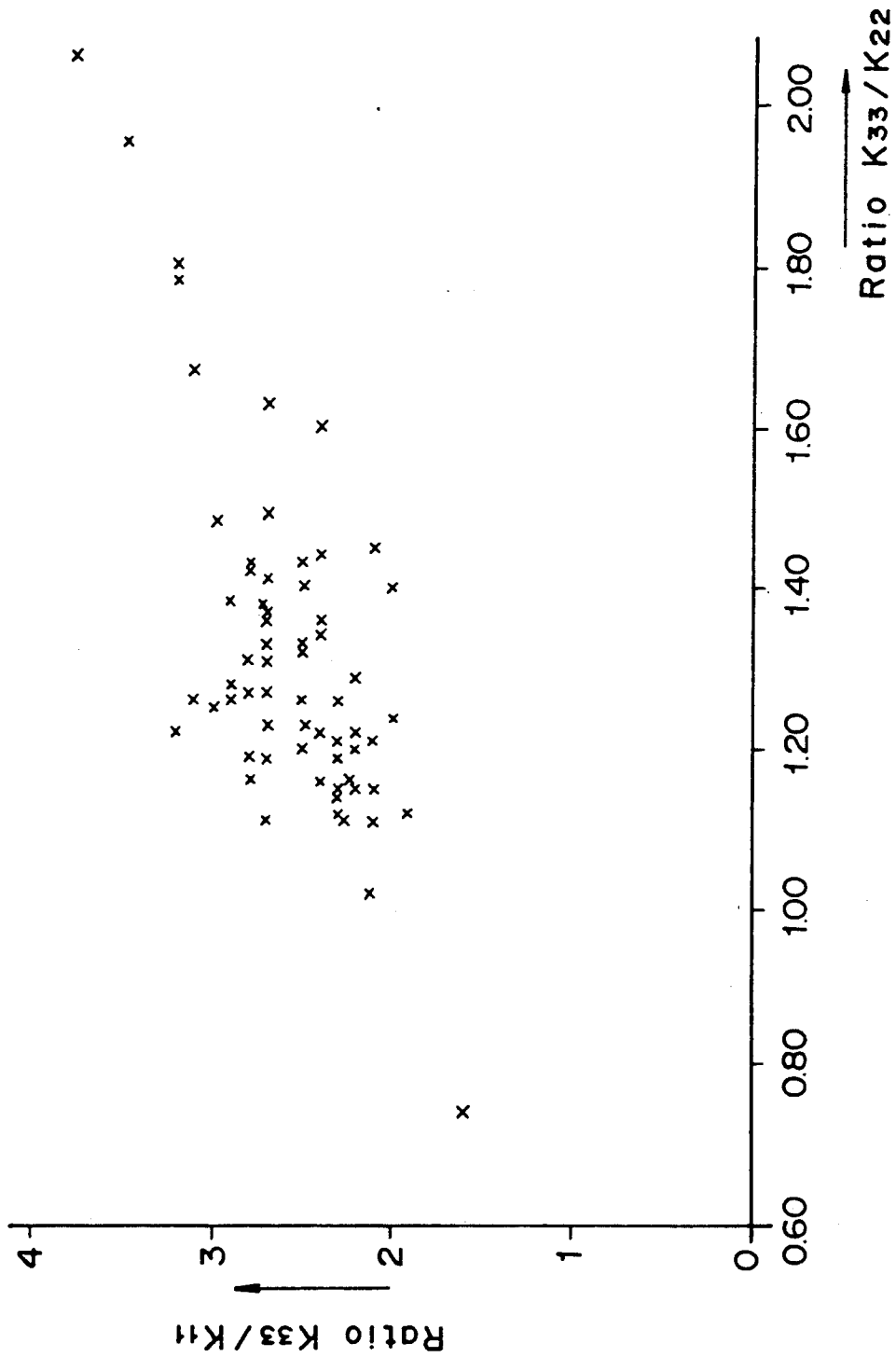
FIG. 5 is a graph showing a correlation between a ratio of a bend elastic constant $K_{33}$ to a spray elastic constant $K_{11}$ and a ratio of the bend elastic constant $K_{33}$ to a twist elastic constant $K_{22}$ of various kinds of liquid crystal materials.
Figure 7:
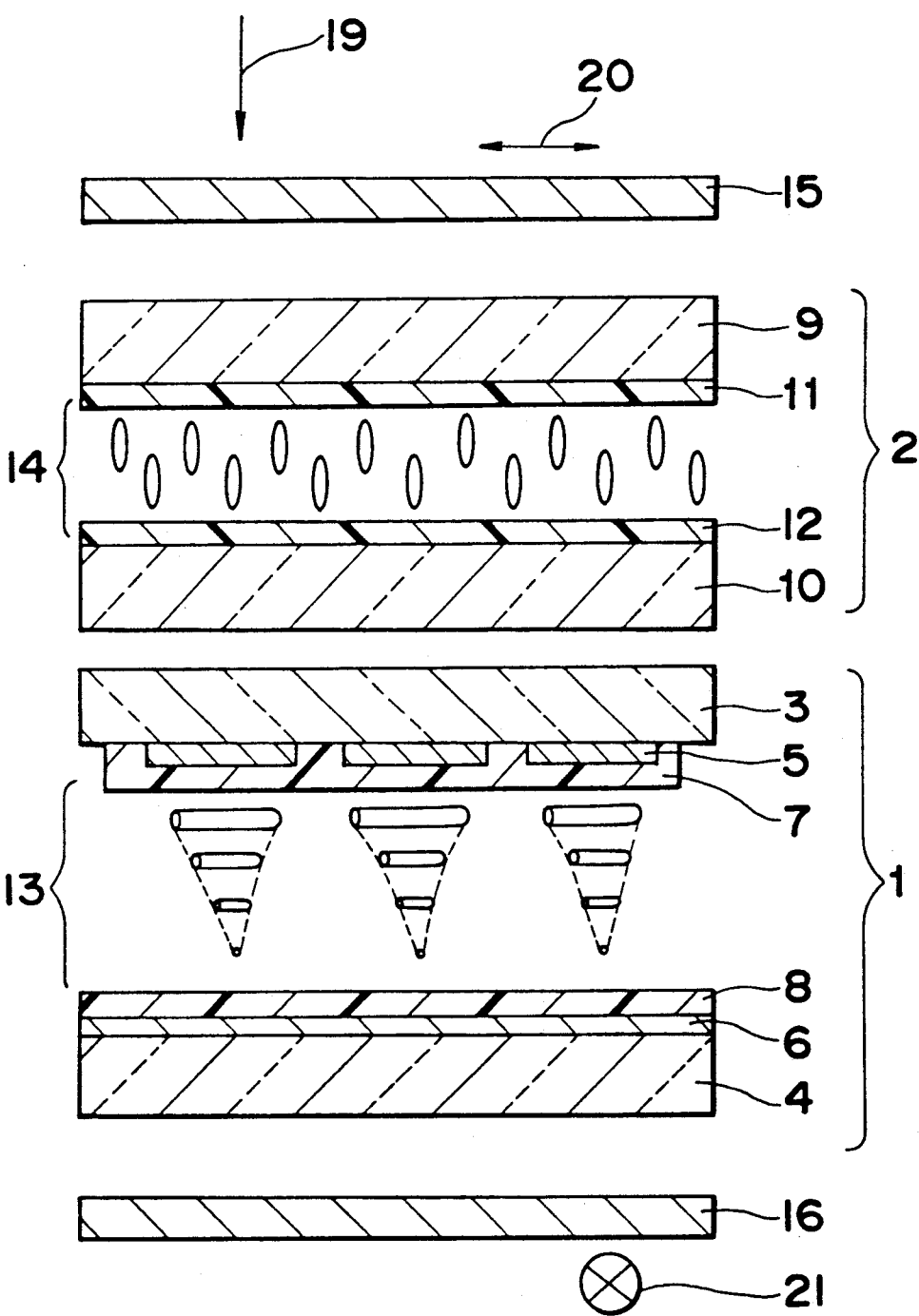
FIG. 7 is an exploded cross sectional view showing a liquid crystal display device of a first preferred embodiment according to the present invention.

FIG. 7 is an exploded cross sectional view showing a TN type liquid crystal display device 18 of a first preferred embodiment according to the present invention. In FIG. 7, the components similar to that shown in FIG. 1 are indicated by the same numerical references as that shown in FIG. 1.

As shown in FIG. 7, the liquid crystal display device 18 has a double layered structure composed of a first cell layer 1 for displaying an image thereon and a second cell layer 2 having an optical birefringence for compensating a change in the retardation caused when light passes through the first cell layer 1. The first and second cell layers 1 and 2 contain liquid crystal layers 13 and 14 therein, respectively. In each of the liquid crystal layers 13 and 14, liquid crystal molecules are arranged in a nematic phase.

The first cell layer 1 has such a structure that the liquid crystal layer 13 is contained between a pair of optically transparent glass substrates 3 and 4 which oppose each other. Further, optically transparent electrode films 5 and 6 for applying a voltage to the liquid crystal layer 13 are formed on respective inner surfaces of the optically transparent substrates 3 and 4, wherein the electrode films 5 and 6 are made of ITO, each of which has patterns composed of plural strips in the manner similar to that of the conventional device 17 shown in FIG. 1. This results in plural pixels in a matrix form being located at respective crossings between respective strips of the electrode films 5 and 6.

Furthermore, orientation membranes 7 and 8 made of an organic material such as polyimide group are formed on respective inner surfaces of the electrode films 5 and 6. Respective surfaces of the orientation membranes 7 and 8 are previously treated by rubbing with a cloth so that liquid crystal of the liquid crystal layer 13 is twisted at an angle of 90° between the optically transparent substrates 3 and 4, as schematically shown in FIG. 7. These optically transparent substrates 3 and 4 of the first cell layer 1 are bonded by a sealing element (not shown) of a resin so that the liquid crystal layer 13 is sealed, resulting in the first cell layer 1 completely constructed.

The second cell layer 2 has such a structure that the liquid crystal layer 14 is contained between a pair of optically transparent glass substrates 9 and 10. Further, orientation membranes 11 and 12 made of an organic material such as those from the silane group are formed on respective inner surfaces of the optically transparent substrates 9 and 10 so that the principal axes of the liquid crystal molecules of the liquid crystal layer 14 are substantially perpendicular to respective surfaces of the optically transparent substrates 3 and 4. Then, a direction of a maximum one of principal refractive indices of the second cell layer 2 for compensating a change in the retardation is substantially perpendicular to respective surfaces of the optically transparent substrates 9 and 10. Namely, it is the direction of the principal axis of each liquid crystal molecule or the optical axis of the liquid crystal of the liquid crystal layer 14. The optically transparent substrates 9 and 10 of the second cell layer 2 are bonded by a sealing element (not shown) of a resin so that the liquid crystal layer 14 is sealed therein, resulting in the second cell layer 2 being completely constructed.

The first and second cell layers 1 and 2 are bonded so as to be stacked so that respective inner surfaces of the optically transparent substrates 3 and 10 are in contact with each other. Furthermore, on respective outer surfaces of the first and second cell layers 1 and 2, a pair of polarizers 16 and 15 are formed so that the polarization axes of the polarizers 16 and 15 cross each other at right angles as indicated by arrows 21 and 20, respectively, in order to attain the liquid crystal display device utilizing the aforementioned normally white display method. Furthermore, a driving circuit (not shown) comprising a regulated voltage power source for applying a predetermined direct-current voltage to the liquid crystal layer 13 of the first cell layer 1 is connected to the electrode films 5 and 6, resulting in the liquid crystal display device 18.

Each of the liquid crystal layers 13 and 14 is made of a nematic liquid crystal material having a positive dielectric anisotropy such as one or a plurality of kinds of compounds of the phenylcyclohexane group. The present invention is not limited to this liquid crystal material. It is to be noted that light is incident onto the outer surface of the polarizer 15 is at a direction perpendicular thereto as indicated by an arrow 19. As schematically shown in FIG. 7, the liquid crystal of the liquid crystal layer 13 is twisted at an angle of 90° between the orientation membranes 7 and 8 in the OFF state thereof or at the application of no voltage thereto. On the other hand, the liquid crystal of the liquid crystal layer 14 is oriented so that the optical axis thereof is substantially perpendicular to respective surfaces of the orientation membranes 11 and 12. As a result, the liquid crystal display device 18 can display a white color image thereon using the normally white method in the OFF state of the liquid crystal layer 13. Namely, it results in such a state where no voltage is applied between the electrode films 5 and 6.

Figure 8:
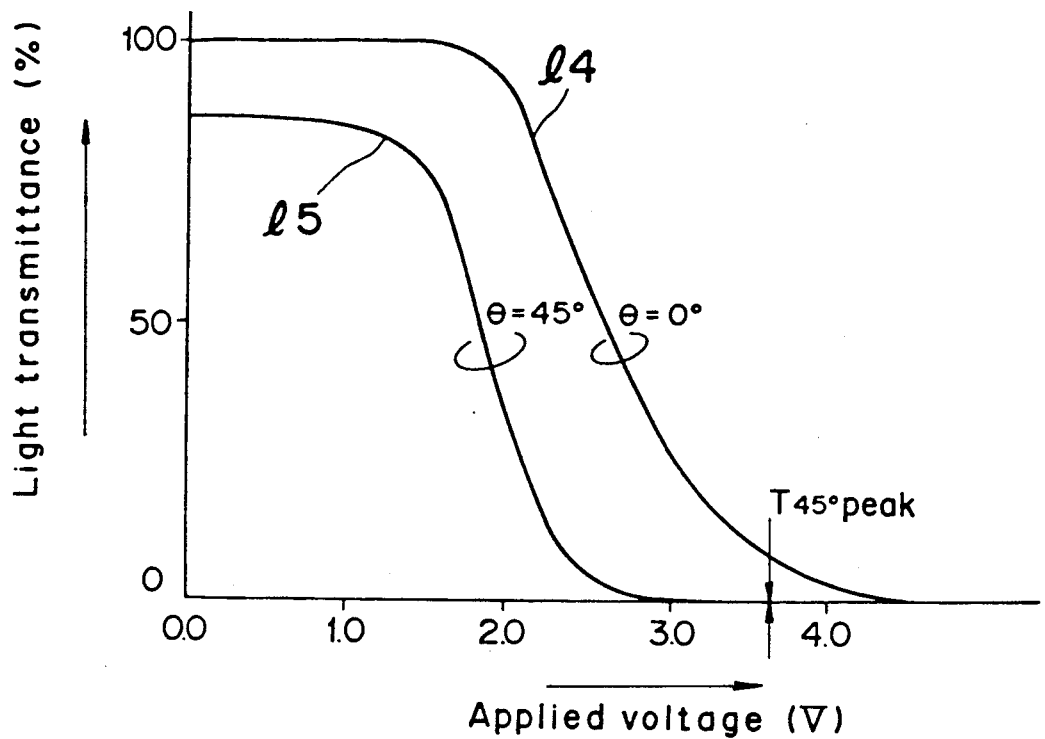
FIG. 8 is a graph showing light transmittance characteristics on an applied voltage of the liquid crystal display device shown in FIG. 7.
Figure 9:
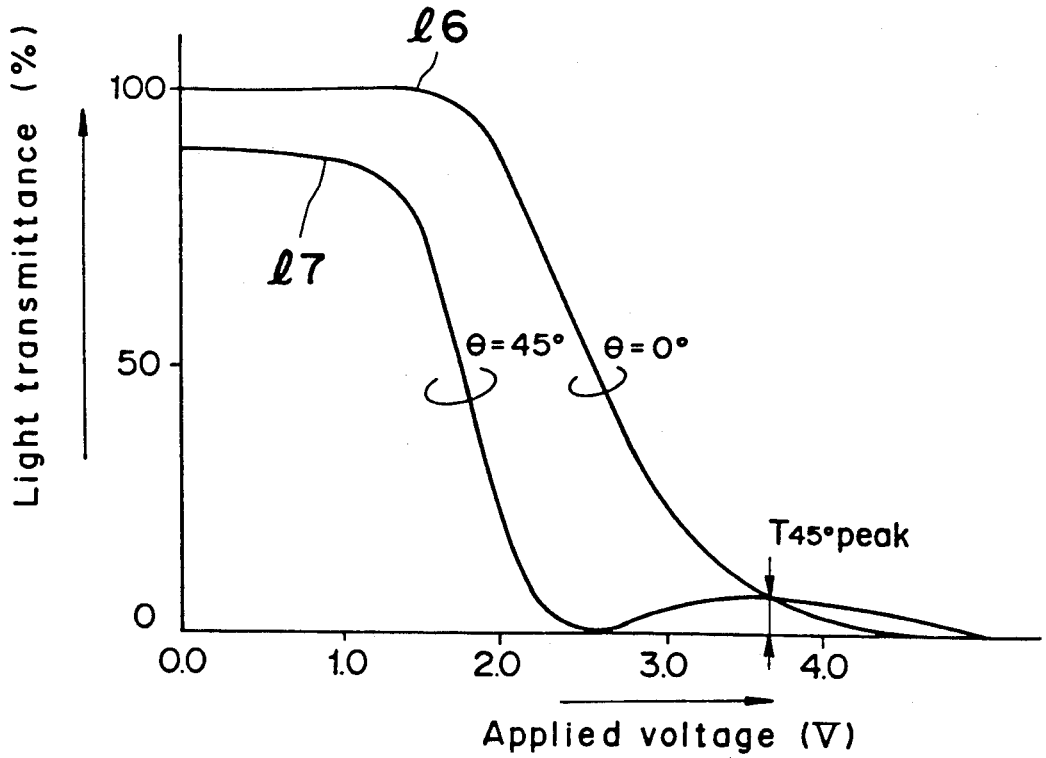
FIG. 9 is a graph showing light transmittance characteristics on an applied voltage of the conventional liquid crystal display device shown in FIG. 1.
Figure 10:
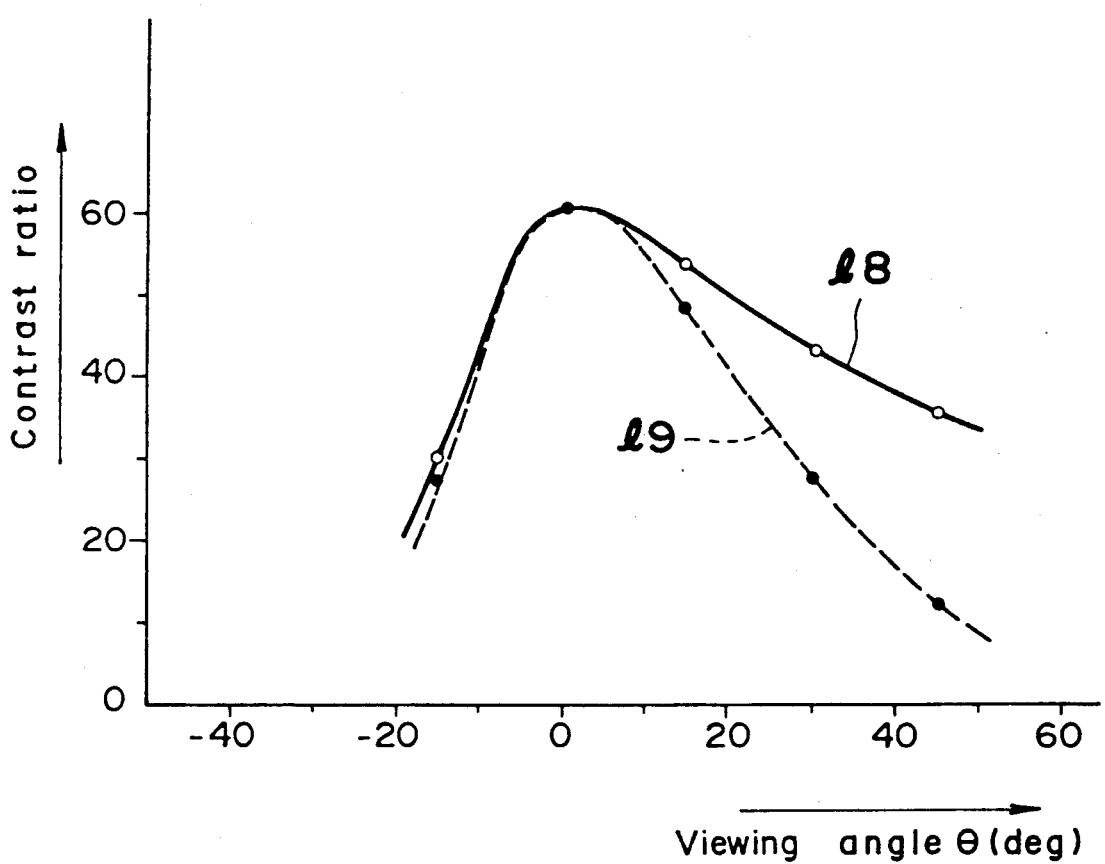
FIG. 10 is a graph showing contrast ratio characteristics on the viewing angle of the liquid crystal display device shown in FIG. 7 and the conventional liquid crystal display device shown in FIG. 1.

FIG. 8 shows light transmittance characteristics on a voltage applied to the first cell layer 1 of the liquid crystal display device 18 (shown in FIG. 7) constructed as described above, FIG. 9 shows light transmittance characteristics on a voltage applied to the cell layer 1 of the conventional liquid crystal display device 17 shown in FIG. 1. These characteristics were obtained under the following conditions in the measurement performed by the inventors of the present invention. Furthermore, FIG. 10 shows contrast ratio characteristics on the viewing angle of the liquid crystal display device 18 and the conventional liquid crystal display device 17.

Respective composition ratios of the liquid crystal layers 13 and 14 of the first and second cell layers 1 and 2 are adjusted so that the birefringence $\Delta n1$ of the liquid crystal layer 13 becomes 0.10 and the birefringence $\Delta n2$ of the liquid crystal layer 14 becomes 0.06 at a wavelength of 550 mms of the light incident thereonto. The thickness d1 of the liquid crystal layer 13 of the first cell layer 1 is set at 5.0 $\mu$ms, and the thickness d2 of the liquid crystal layer 14 of the second cell layer 2 is set at 2.0 $\mu$ms. Therefore, the retardation $\Delta n1 \cdot d1$ of the first cell layer 1 becomes 0.50 $\mu$ms, and the retardation $\Delta n2 \cdot d2$ of the second cell layer 2 becomes 0.12 $\mu$ms.

Normally, after light incident onto the liquid crystal display device 18 has passed through the polarizer 15, the incident light becomes linearly polarized light. However, when the incident light, having passed through the polarizer 15, passes through the liquid crystal layer 13, the incident light may become elliptically polarized light corresponding to a phase difference between ordinary light and extraordinary light generated due to the birefringence of the liquid crystal of the liquid crystal layer 13. In order to solve the aforementioned problem, there is provided the second cell layer 2 for canceling the aforementioned phase difference which is constituted so as to satisfy respective aforementioned requirements. Thus, the light having passed through the first and second cell layers 1 and 2 becomes linearly polarized light again.

FIG. 11 shows a retardation characteristic on the viewing angle $\theta$ of the first cell layer 1, and FIG. 12 shows a retardation characteristic on the viewing angle $\theta$ of the second cell layer 2.

As shown in a characteristic curve 122 of FIG. 11, the retardation of the first cell layer 1 decreases as the viewing angle $\theta$ increases. On the other hand, as shown in a characteristic curve 123 of FIG. 12, the retardation of the second cell layer 2 increases as the viewing angle $\theta$ increases. Therefore, the liquid crystal display device 18 comprising the stacked first and second cell layers 1 and 2 can offset a change in the retardation caused when the light passes through the first cell layer, and can cancel the aforementioned phase difference.

In this case, in the liquid crystal display device 18, even though the linearly polarized light having the polarization direction as indicated by the arrow 20, which has passed through the polarizer 15, passes through the first and second cell layers 1 and 2, the light having passed therethrough is kept as linearly polarized light. Thereafter, the linearly polarized light having the polarization direction perpendicular to the direction as indicated by the arrow 21 is incident onto the polarizer 16, and is shaded by the polarizer 16. Then, when the user watches the liquid crystal display device 18 from the lower side in FIG. 7, an image can be displayed without inversion of the gradation.

When the user watches the liquid crystal display device 18 from the lower side of FIG. 7 and the aforementioned viewing angle $\theta$ is equal to or larger than a predetermined angle, the incident light is totally reflected on a surface of the polarizer 16. Then, the user cannot watch an image displayed on the liquid crystal display device 18 therefrom. On the other hand, in the conventional liquid crystal device 17, the aforementioned light transmittance $T\theta$peak appears at any viewing angle $\theta$ other than 0°. However, actually, the generation of the aforementioned peak value $T\theta$peak of the light transmittance can be canceled in the vicinity of a threshold angle $\theta c$ such as about 50°, by enabling the incident light to be totally reflected as described above.

In FIG. 8, the characteristic curves 14 and 15 show light transmittance characteristics on a voltage applied to the liquid crystal layer 13 of the first cell layer 1 in the cases of viewing angles of 0° and 45°, respectively, which are obtained by the measurement of the liquid crystal display 18 of the preferred embodiment according to the present invention. In FIG. 9, the characteristic curves 16 and 17 show light transmittance characteristics on a voltage applied to the liquid crystal layer 13 of the first cell layer 1 in the cases of viewing angles of 0° and 45°, respectively, which are obtained by the measurement of the conventional liquid crystal display device 17 shown in FIG. 1.

As is apparent from comparison between the characteristics shown in FIGS. 8 and 9, the characteristic curves 14 and 16 show substantially the same tendency in the case of a viewing angle of 0°. Particularly, both the light transmittances of the liquid crystal devices 17 and 18 become about zero % at the application of a voltage equal to or larger than 4.0 V.

In comparison between the characteristic curves 15 and 17 in the case of a viewing angle of 45°, the light transmittance of the liquid crystal display device 18 of the preferred embodiment shown in FIG. 7 becomes about zero % at the application of a voltage equal to or larger than 3.0 V. On the other hand, the light transmittance of the conventional liquid crystal display device 17 shown in FIG. 1 becomes about zero % at the application of a voltage of about 2.5 V. However, a rising phenomenon that the light transmittance increases again in the range of the applied voltage from about 3.0 V to about 4.0 V.

Therefore, according to the present preferred embodiment of the present invention, the aforementioned peak value $T\theta$peak of the light transmittance appearing at a viewing angle $\theta$ larger than 0° in the conventional liquid crystal device 17 shown in FIG. 1 can be canceled, and a monochromatic image composed of white and black images or a color image can be displayed thereon in improved display characteristics without inversion of the gradation. This results in a liquid crystal display device for displaying an image being of in a higher quality than that of the conventional liquid crystal display device.

The viewing angle $\theta$ at which the aforementioned effects can be obtained is not limited to the range between the threshold angle $\theta c^\circ$ and $0^\circ$. As described above, as far as the viewing angle $\theta$ is larger than $0^\circ$, the aforementioned effects can be obtained at any viewing angle $\theta$. The aforementioned threshold angle $\theta c$ is nothing more than an upper limit of a range in practical use when the total reflection of the incident light is taken into consideration.

In the contrast ratio characteristics on the viewing angle $\theta$ shown in FIG. 10, a characteristic curve 18 corresponds to the characteristic (shown in FIG. 8) of the liquid crystal display device 18 of the first preferred embodiment, wherein the contrast ratio is calculated as a ratio of a light transmittance at the application of no voltage to the peak value T$\theta$peak of the light transmittance. A characteristic curve 19 corresponds to the characteristic (shown in FIG. 9) of the conventional liquid crystal display device 17, and shows the same characteristic thereof.

As is apparent from FIG. 10, when the second cell layer 2 for compensating a change in the retardation is provided in the liquid crystal display device 18, it is understood that the contrast ratio thereof is improved over almost the whole range of the viewing angle $\theta$ and the viewing angle characteristics are improved as compared with that of the conventional device 17.

Furthermore, in the range of the viewing angle $(-45^\circ \leq \theta \leq 45^\circ)$ in practical use, in order to almost cancel the peak value T$\theta$peak of the light transmittance (T$\theta$peak$=0\%$) so as to improve the contrast ratio, respective retardations $\Delta n1 \cdot d1$ and $\Delta n2 \cdot d2$ of the first and second cell layers 1 and 2 are preferably set so as to fall within the following ranges.

$$0.3 \ \mu ms < \Delta n1 \cdot d1 < 0.6 \ \mu ms \qquad (2)$$

$$0.05 \ \mu ms < \Delta n2 \cdot n2 < 0.3 \ \mu ms \qquad (3)$$

A TN type liquid crystal device of a modification of the first preferred embodiment will be described below.

In the TN type liquid crystal device, an optical film made by shaping polymeric liquid crystal material may be used in place of the second cell layer 2 for compensating a change in the retardation. The optical film is made as follows.

First of all, a polymeric liquid crystal material having a predetermined polarity is heated at a high temperature so as to melt. A predetermined voltage is applied to the melted polymeric liquid crystal material, and then, the liquid crystal is oriented by the polarity thereof so that the principal axes of the polymeric liquid crystal molecules thereof become substantially parallel to the direction of an electric field generated by a voltage applied thereto. Thereafter, the melted polymeric liquid crystal material is cooled so as to harden in such a state that the principal axes of the polymeric liquid crystal molecules are substantially parallel to the direction of the electric field as described above. Then, the principal axes of the liquid crystal molecules in the hardened polymeric liquid crystal material are fixed so as to be substantially parallel to a predetermined direction, and the polymeric liquid crystal material made in such a manner is shaped into a film configuration, resulting in the optical film having an optical birefringence.

The direction of the principal axis of each polymeric liquid crystal molecule or a direction of a maximum one of principal refractive indices of the optical film for compensating a change in the retardation is oriented in a direction substantially parallel to the direction in which the incident light passes through the first cell layer 1 for displaying an image thereon. Namely, this occurs so as to cross the respective surfaces of each layer at an angle in the range between $80^\circ$ and $90^\circ$. This results in the TN type liquid crystal display device being a modification of the first preferred embodiment. It is confirmed by the experiment performed by the inventors of the present invention that the liquid crystal display device of the modification has an improved dependency of light transmittance on the viewing angle $\theta$, similar to that of the liquid crystal display device 18 of the first preferred embodiment shown in FIG. 7.

The optical film having an optical birefringence which is used as the second cell layer 2 for compensating a change in the retardation can be made by applying a predetermined voltage to an ionic liquid crystal material in such a melting state thereof that it is heated and cooling it so as to harden it, in the manner similar to that of the aforementioned polymeric liquid crystal material. The aforementioned light transmittance characteristics on the viewing angle upon displaying an image on the liquid crystal display device can be improved by using this optical film as the second cell layer 2 for compensating a change in the retardation.

It is to be noted that the second cell layer 2 or the optical film for compensating a change in the retardation may be arranged at any position between a pair of polarizers 15 and 16.

Second Preferred Embodiment

In a polystyrene film represented by the following chemical formula in a general form,

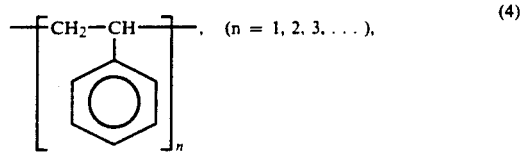

$$(n = 1, 2, 3, \ldots), \qquad (4)$$

a benzene ring is oriented in a direction of the thickness of the film. Namely, it is oriented in a direction of the normal perpendicular to the surface of the film. Therefore, a bias of the distribution density of electrons therein increases in the direction of the thickness of the film, and the refractive index in the direction of the thickness thereof becomes larger than that in the surface thereof. Namely, such a film can be one of a means for compensating a change in the retardation which has an optical birefringence wherein the direction of the maximum one of principal refractive indices thereof is substantially parallel to the direction of the normal perpendicular to the surfaces of the film.

The light transmittance characteristics depending on the viewing angle upon displaying an image on the liquid crystal display device can be improved by arranging the polystyrene film on at least one side of the liquid crystal display layer. As described later, a film for compensating a change in the retardation which is constituted by the aforementioned polystyrene film has a remarkable effect for a liquid crystal display device comprising means for canceling the phase difference such as the aforementioned optical phase difference cancellation films 28 and 29.

Figure 13:
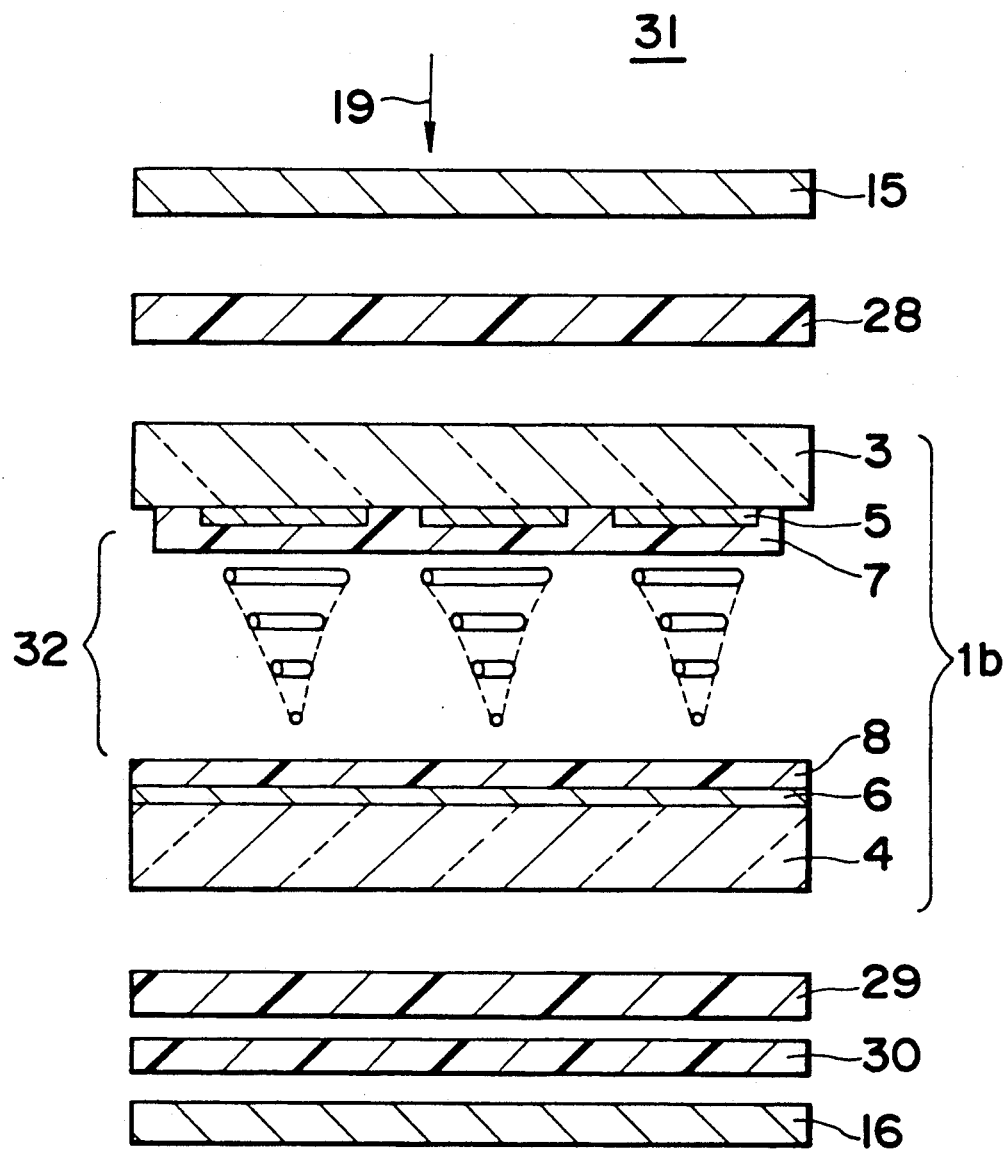
FIG. 13 is an exploded cross sectional view showing a liquid crystal display device of a second preferred embodiment according to the present invention.

FIG. 13 is an exploded cross sectional view of a liquid crystal display device 31 of a second preferred embodiment according to the present invention. In FIG. 13, the components similar to that shown in FIG. 7 are indicated by the same numerical reference as that shown in FIG. 7.

The liquid crystal display device 31 is made as follows.

A display cell layer 1b for displaying an image thereon is made in the manner similar to that of the first cell layer 1 of the liquid crystal display device 18 of the first preferred embodiment shown in FIG. 7, except for a liquid crystal layer 32 which is contained between a pair of optically transparent substrates 3 and 4. As a liquid crystal material of the liquid crystal layer 32, a mixed liquid crystal of a nematic liquid crystal material is used having positive dielectric anisotropy, such as liquid crystal of the phenylcyclohexane (PCH) group, to which 0.1 wt % of a chiral dopant S-811 ® made by Merk & Co., Inc. is added, in order to regulate the twist direction thereof. The birefringence $\Delta n3$ of the liquid crystal layer 32 is set at 0.096, and the thickness d3 thereof is set at 6.0 $\mu$ms.

Figure 6:
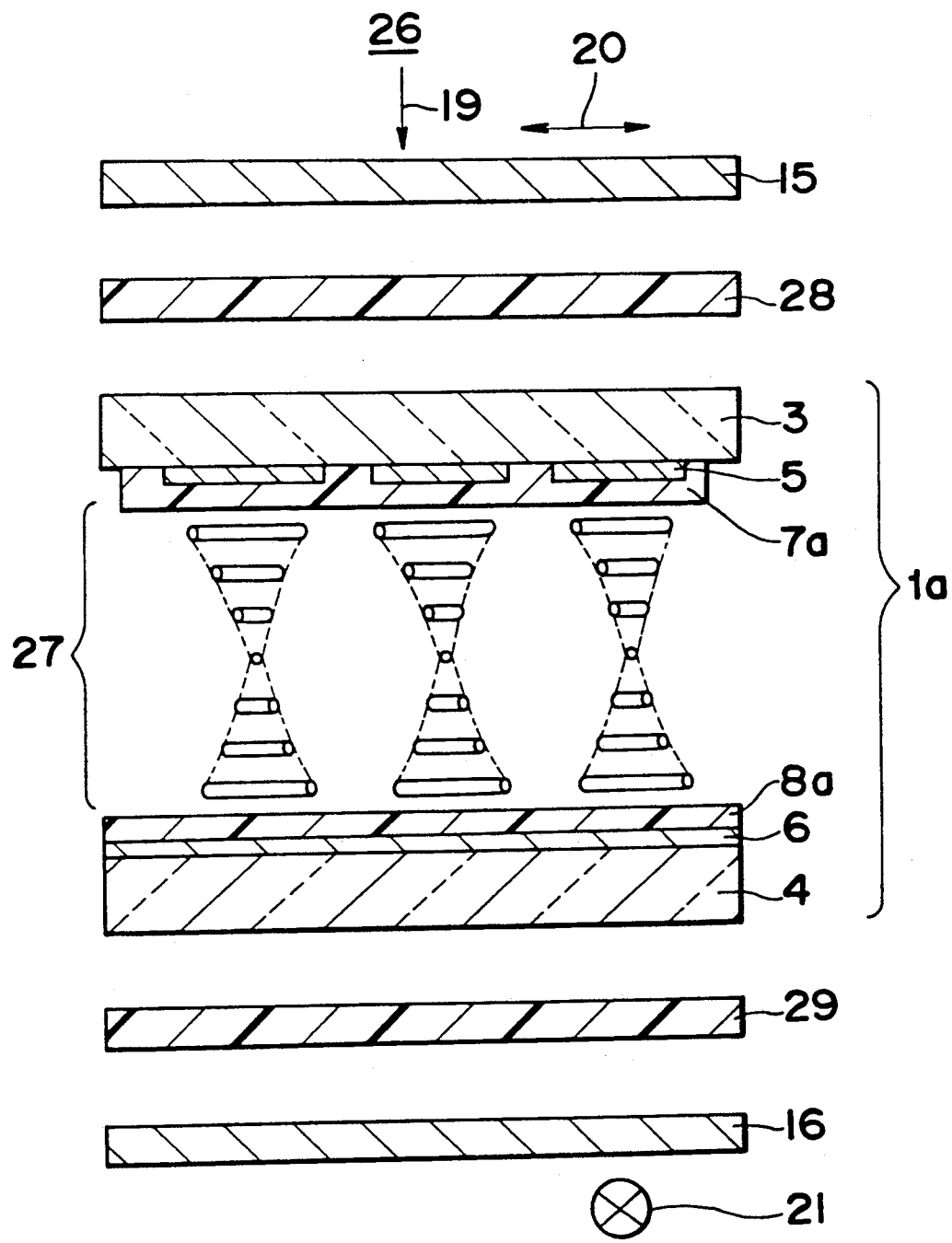
FIG. 6 is an exploded cross sectional view showing a conventional super twisted nematic type liquid crystal display device.

In the manner similar to that of the conventional STN type liquid crystal device 26 shown in FIG. 6, a pair of phase difference cancellation films 28 and 29 are formed on respective outer surfaces of the optically transparent substrates 3 and 4, and a pair of polarizer 15 and 16 are formed on respective outer surfaces of the phase difference cancellation films 28 and 29.

In the present preferred embodiment, a film 30 for compensating a change in the retardation (referred to as a retardation compensation film hereinafter) according to the present invention, is further arranged between the phase difference cancellation film 29 and the polarizer 16.

Each of the phase difference cancellation films 28 and 29 is a uniaxially drawn polycarbonate film having a predetermined optical axis, and the retardation thereof is 200 nms for the light transmitting in a direction of the normal perpendicular to respective surfaces of the phase difference cancellation films 28 and 29. The retardation compensation film 30 is made of polystyrene, and the retardation $(n_a - n_b) \cdot d5$ thereof is 30 nms for the light transmitting in a direction of the normal perpendicular to the surface of the retardation compensation film 30, wherein $n_a$ and $n_b$ ($n_a > n_b$) are two kinds of principal refractive indices in a direction parallel to the surface of the retardation compensation film 30, and d5 is the thickness thereof. The retardation $(n_c - n_b) \cdot d5$ is 70 nms for the light transmitting in the direction parallel to the surface of the retardation compensation film 30, wherein $n_c$ is another principal refractive index in the direction of the normal perpendicular to the surfaces of the retardation compensation film 30, which is a maximum one of the principal refractive indices.

Figure 14:
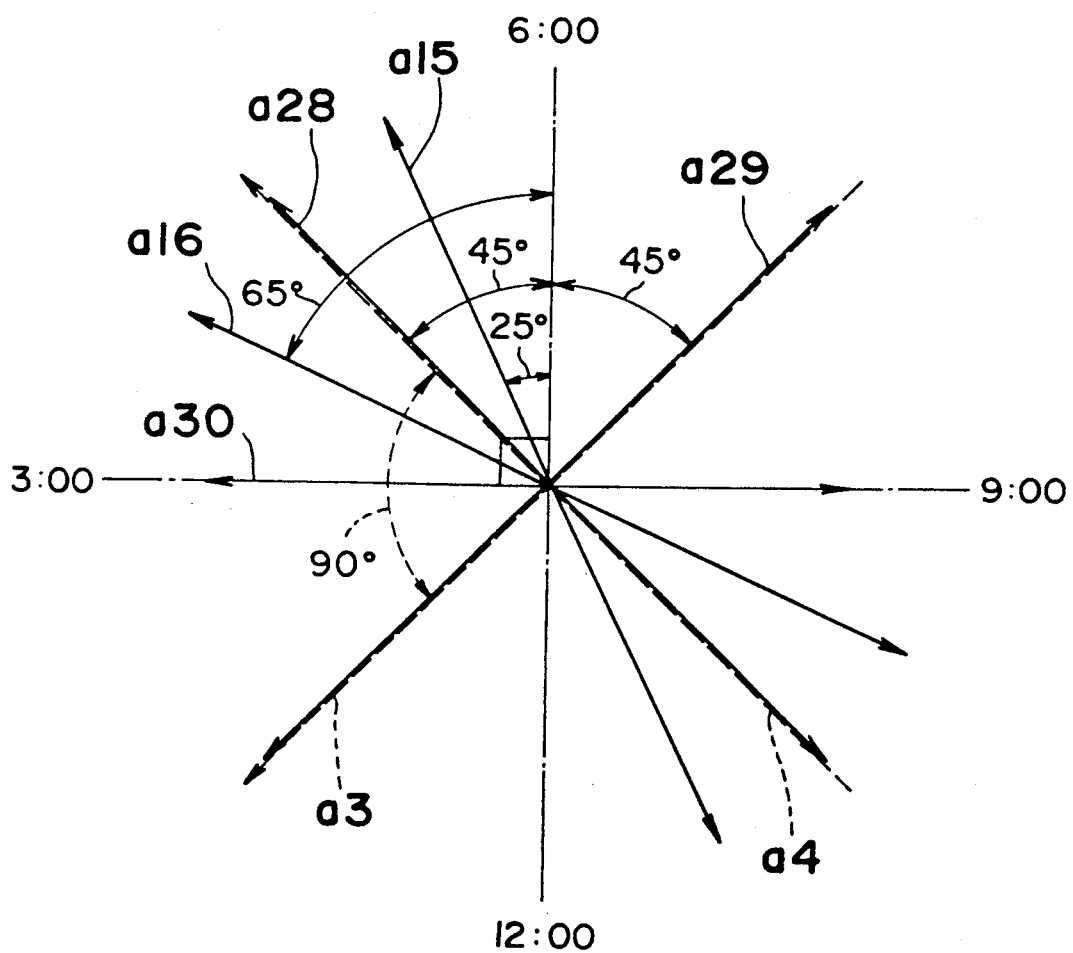
FIG. 14 is a diagram showing a relationship among respective orientation angles of the components of the liquid crystal display device shown in FIG. 13.
Figure 17:
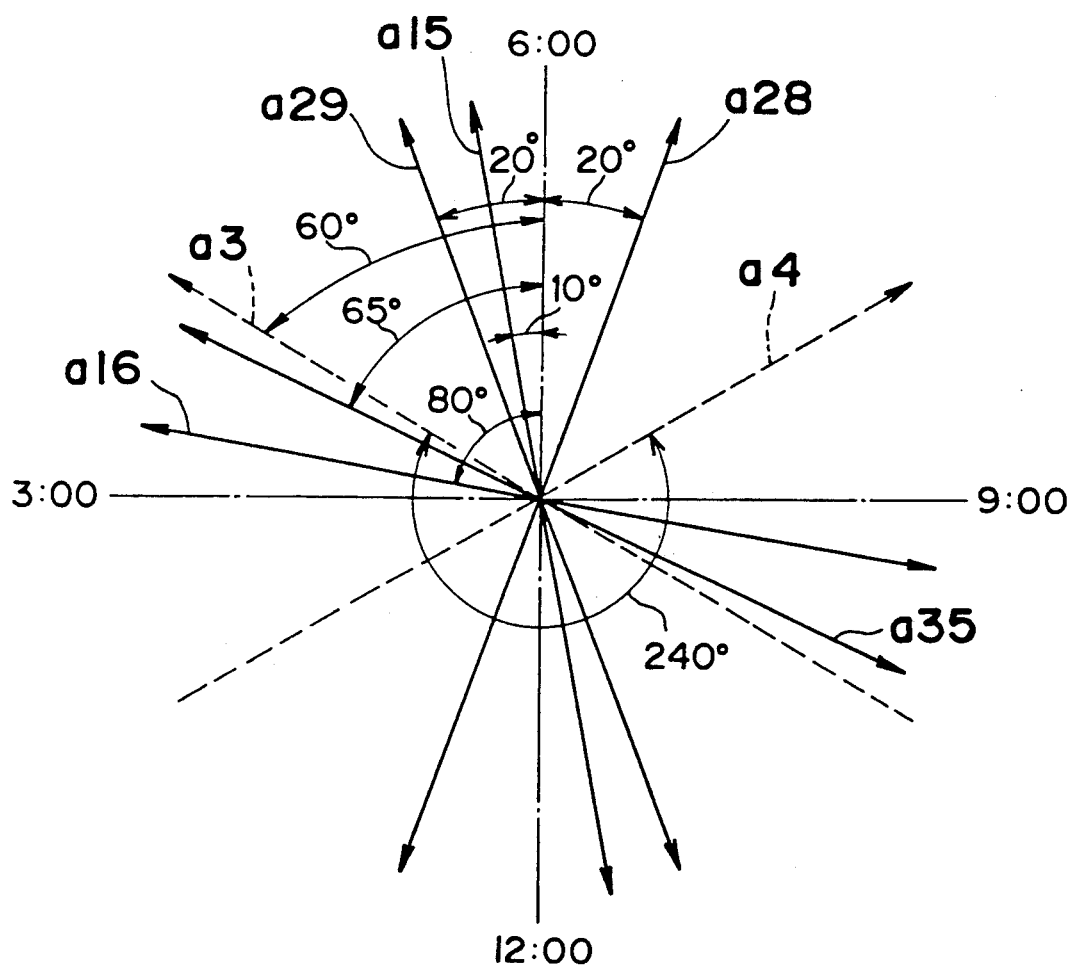
FIG. 17 is a diagram showing a relationship among respective orientation angles of the components of the liquid crystal display device shown in FIG. 16.
Figure 20:
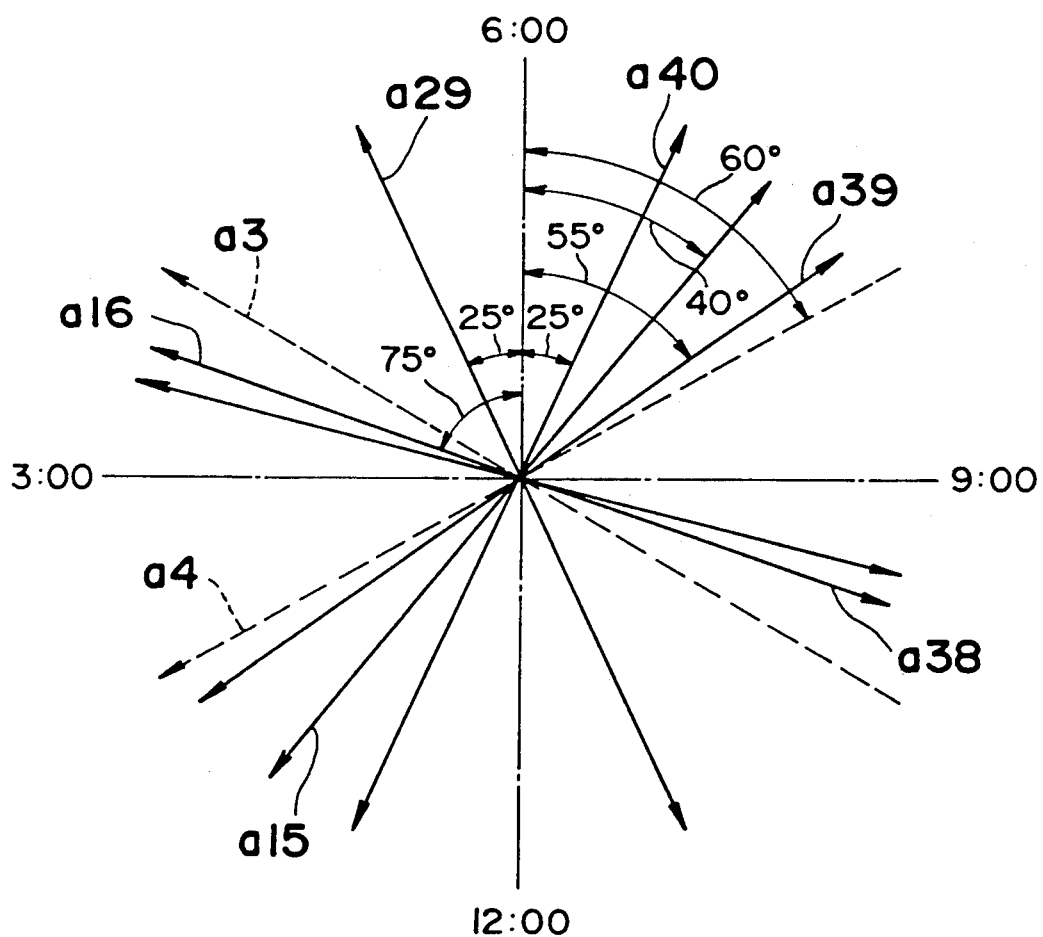
FIG. 20 is a diagram showing a relationship among respective orientation angles of the components of the liquid crystal display device shown in FIG. 19.

FIG. 14 shows a relationship among orientation angles of the liquid crystal of the liquid crystal layer 32, respective optical axes of the phase difference cancellation films 28 and 29, the optical axis of the retardation compensation film 30, and respective polarization axes of the polarizers 15 and 16, when viewed in the direction perpendicular to respective surfaces of the optically transparent substrates 3 and 4 of the liquid crystal display device 31 shown in FIG. 13. In FIG. 14, respective directions are represented by using the positions of respective hours displayed on a clock. The up and down directions in FIG. 13 correspond to directions of 6 o'clock and 12 o'clock shown in FIG. 14, and the left and right directions correspond to directions of 3 o'clock and 9 o'clock shown in FIG. 14. In FIGS. 17 and 20, respective orientation angles of the components are also represented in a manner similar to that shown in FIG. 14.

As shown in FIG. 14, the principal axes of the liquid crystal molecules of the liquid crystal layer 32, which are arranged on the side of the optically transparent substrate 3, are parallel to a direction as indicated by an arrow a3 which is rotated by an angle of 45° from the direction of 6 o'clock toward the direction of 9 o'clock. Further the principal axes thereof, which are arranged on the side of the optically transparent substrate 4, are parallel to a direction as indicated by an arrow a4 which is further rotated in the clockwise direction by right angle from the direction as indicated by the arrow a3.

Respective directions of the maximum one of the principal refractive indices or the optical axis of the phase difference cancellation films 28 and 29 coincide with the directions as indicated by the arrows a4 and a3. Also, the polarization direction of the polarizer 15 is oriented in a direction as indicated by an arrow a15, which is rotated at an angle of 25° from the direction of 6 o'clock toward the direction of 3 o'clock. Further the polarization direction of the polarizer 16 is oriented in a direction as indicated by an arrow a16, which is rotated by an angle of 65° from the direction of 6 o'clock toward the direction of 3 o'clock. Further, the drawing direction or the direction of the aforementioned principal refractive index $n_a$ of the retardation compensation film 30 is oriented in the directions of 3 o'clock and 9 o'clock. The relationship among these orientation directions is suitably determined so as to enlarge the range of the viewing angle $\theta$ to improve the contrast ratio upon displaying an image on the liquid crystal display device. In the cases of FIGS. 17 and 20, to be described later, this relationship is similarly determined.

FIGS. 15a and 15b are graphs showing contrast ratio characteristics on the viewing angle of the liquid crystal display device 31. In FIG. 15a, a characteristic curve 110 shows a contrast ratio characteristic on the viewing angle when viewed from a plane including the aforementioned directions of 6 o'clock and 12 o'clock perpendicular to respective surfaces of the optically transparent substrates 3 and 4 of the liquid crystal display device 31. Further a characteristic curve 111 shows the same characteristic of the conventional liquid crystal display device 17 shown in FIG. 1. In FIG. 15b, a characteristic curve 112 shows the same characteristic of the liquid crystal display device 31 when viewed from a plane including the aforementioned directions of 3 o'clock and 9 o'clock. Further a characteristic curve 113 shows the same characteristic of the conventional liquid crystal display device 17.

As is apparent from FIGS. 15a and 15b, it is understood that, in the case of a contrast ratio equal to or larger than five, the range of the viewing angle in the directions 6 o'clock and 12 o'clock is enlarged by an angle equal to or larger than 26°. Further the range thereof in the directions of 3 o'clock and 9 o'clock is enlarged by an angle equal to or larger than 7°.

In the present preferred embodiment, the TN type liquid crystal display device according to the present invention is described above, however, the present invention is not limited to this. For example, the present invention is applied to an STN type liquid crystal display device having a twist angle of the liquid crystal which is equal to or larger than 90°.

Third Preferred Embodiment

FIG. 16 is an exploded cross sectional view showing a liquid crystal display device 33 of a third preferred embodiment according to the present invention. In FIG. 16, the components similar to that shown in FIGS. 7 and 13 are indicated by the same numerical references as that shown in FIGS. 7 and 13.

The liquid crystal display device 33 is made as follows.

A display cell layer 1c for displaying an image is made in the manner similar to that of the second preferred embodiment shown in FIG. 13, except for a pair of orientation membranes 7a and 8a and a liquid crystal layer 34. Namely, respective inner surfaces of the orientation membranes 7a and 8a are previously treated by rubbing with a cloth so that the liquid crystal of the liquid crystal layer 34 is twisted at an angle of 240°.

In the manner similar to that the conventional STN type liquid crystal device 26 shown in FIG. 6, a pair of phase difference cancellation films 28 and 29 are formed on respective outer surfaces of the optically transparent substrates 3 and 4, and a pair of polarizers 15 and 16 are formed on respective outer surfaces of the phase difference cancellation films 28 and 29. In the present preferred embodiment, a retardation compensation film 35 according to the present invention is further arranged between the phase difference cancellation film 29 and the polarizer 16.

As a liquid crystal material of the liquid crystal layer 34, a mixed liquid crystal of a nematic liquid crystal material is used having a positive dielectric anisotropy such as a liquid crystal of a phenylcyclohexane (PCH) group and pyrimidine group, to which 0.76 wt % of a chiral dopant S-811® made by Merk & Co., Inc. is added in order to regulate the twist direction thereof. The birefringence $\Delta n4$ of the liquid crystal layer 34 is set at 0.123, and the thickness d4 thereof is set at 7.5 μms.

Each of the phase difference cancellation films 28 and 29 is a uniaxially drawn polycarbonate film having a predetermined optical axis, and the retardation thereof is 400 nms for the light transmitting in a direction of the normal perpendicular to respective surfaces of the phase difference cancellation films 28 and 29. The retardation compensation film 35 is made of polystyrene, and the retardation $(n_a-n_b)\cdot d6$ thereof is 30 nms for the light transmitting in a direction of the normal perpendicular to the surface of the retardation compensation film 35, wherein d6 is the thickness thereof. The retardation $(n_c-n_b)\cdot d6$ is 70 nms for the light transmitting in the direction parallel to the surface of the retardation compensation film 35.

FIG. 17 shows a relationship among orientation angles of the liquid crystal of the liquid crystal layer 34, respective optical axes of the phase difference cancellation films 28 and 29, the optical axis of the retardation compensation film 35, and respective polarization axes of the polarizers 15 and 16, when viewed in the direction perpendicular to respective surfaces of the optically transparent substrates 3 and 4 of the liquid crystal display device 33 shown in FIG. 16.

As shown in FIG. 17, the principal axes of the liquid crystal molecules of the liquid crystal layer 34, which are arranged on the side of the optically transparent substrate 3, are parallel to a direction as indicated by an arrow a3 which is rotated at an angle of 60° from the direction of 6 o'clock toward the direction of 3 o'clock. Further the principal axes thereof which are arranged on the side of the optically transparent substrate 4, are parallel to a direction as indicated by the arrow a4 which is rotated by an angle of 240° in the counterclockwise direction from the direction as indicated by the arrow a3.

Also, the direction of the maximum one of the principal refractive indices or the optical axis of the phase difference cancellation film 28 is oriented in a direction as indicated by an arrow a28, which is rotated by an angle of 20° from the direction of 6 o'clock toward the direction of 9 o'clock. Still further the direction of the maximum one of the principal refractive indices or the optical axis of the phase difference cancellation film 29 is oriented in a direction as indicated by an arrow a29 which is rotated by an angle of 20° from the direction of 6 o'clock to the direction of 3 o'clock. Further, the polarization direction of the polarizer 15 is oriented in a direction as indicated by an arrow a15, which is rotated by an angle of 10° from the direction of 6 o'clock toward the direction of 3 o'clock. Still further, the polarization direction of the polarizer 16 is oriented in a direction as indicated by an arrow a16, which is rotated by an angle of 80° from the direction of 6 o'clock toward the direction of 3 o'clock. Further, the drawing direction or the direction of the aforementioned principal refractive index $n_a$ of the retardation compensation film 35 is oriented in a direction as indicated by an arrow a35, which is rotated at an angle of 65° from the direction of 6 o'clock toward the direction of 3 o'clock.

Figure 18A:
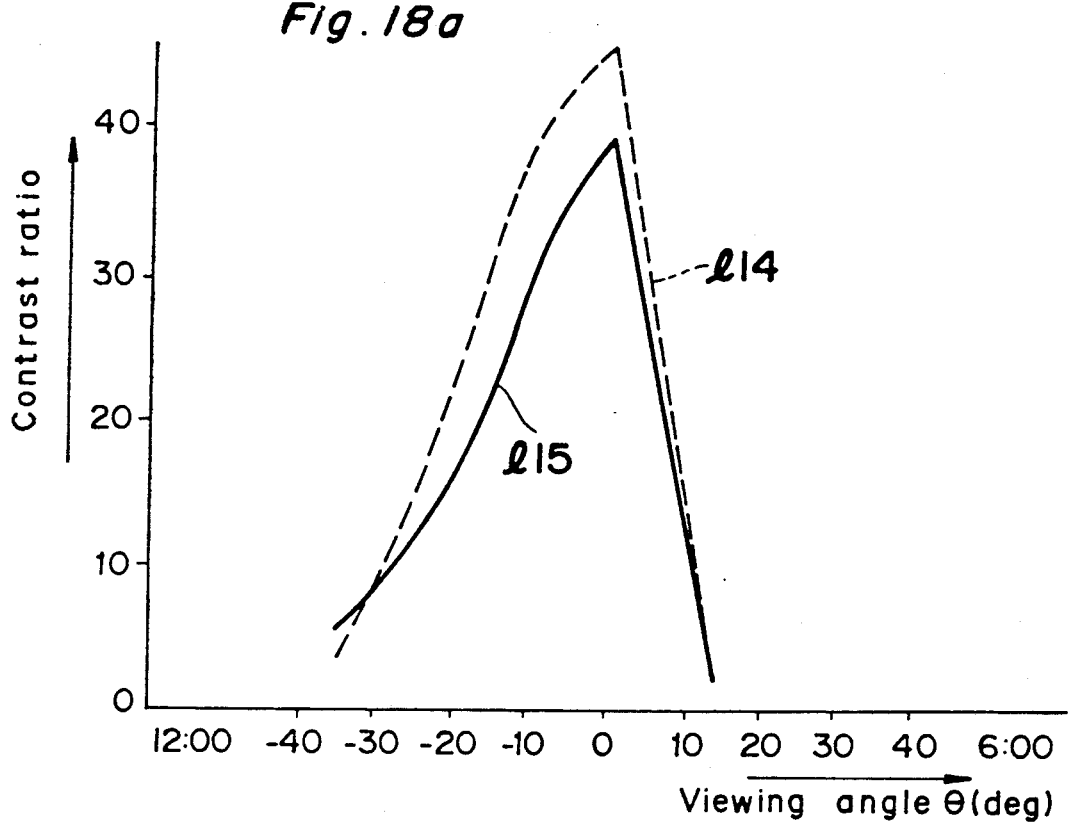
FIGS. 18a and 18b are graphs showing contrast ratio characteristics on the viewing angle of the liquid crystal display device shown in FIG. 16 and the conventional liquid crystal display device shown in FIG. 6.
Figure 18B:
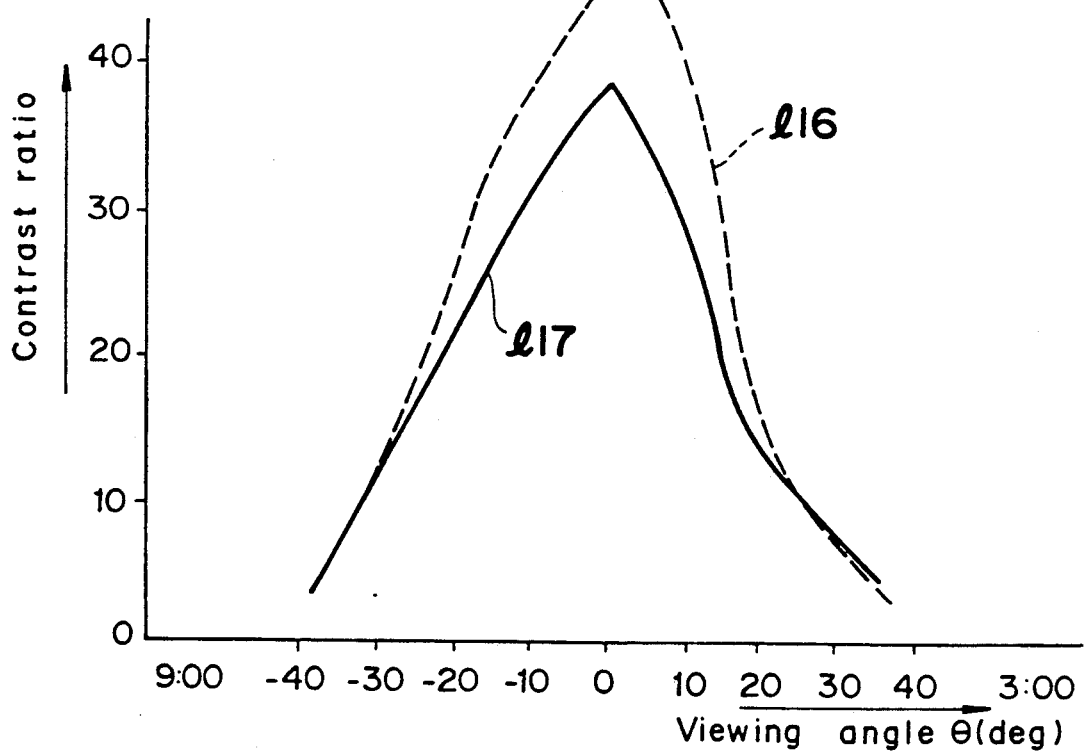

FIGS. 18a and 18b are graphs showing contrast ratio characteristics on the viewing angle of the liquid crystal display device 33. In FIG. 18a, a characteristic curve 115 shows a contrast ratio characteristic on the viewing angle when viewed from a plane including the aforementioned directions of 6 o'clock and 12 o'clock of the liquid crystal display device 33. Further, a characteristic curve 114 shows the same characteristic of conventional liquid crystal display device 26 shown in FIG. 6. In FIG. 15b, a characteristic curve 117 shows the same characteristic of the liquid crystal display device 33 when viewed from a plane including the aforementioned directions of 3 o'clock and 9 o'clock, and a characteristic curve 116 shows the same characteristic of the conventional liquid crystal display device 26.

As is apparent from FIGS. 18a and 18b, it is understood that, in the case of a contrast ratio of five, the range of the viewing angle in the directions of 6 o'clock and 12 o'clock is enlarged by an angle equal to or larger than 5°, as compared with that of the conventional liquid crystal display device 26.

Fourth Preferred Embodiment

Figure 19:
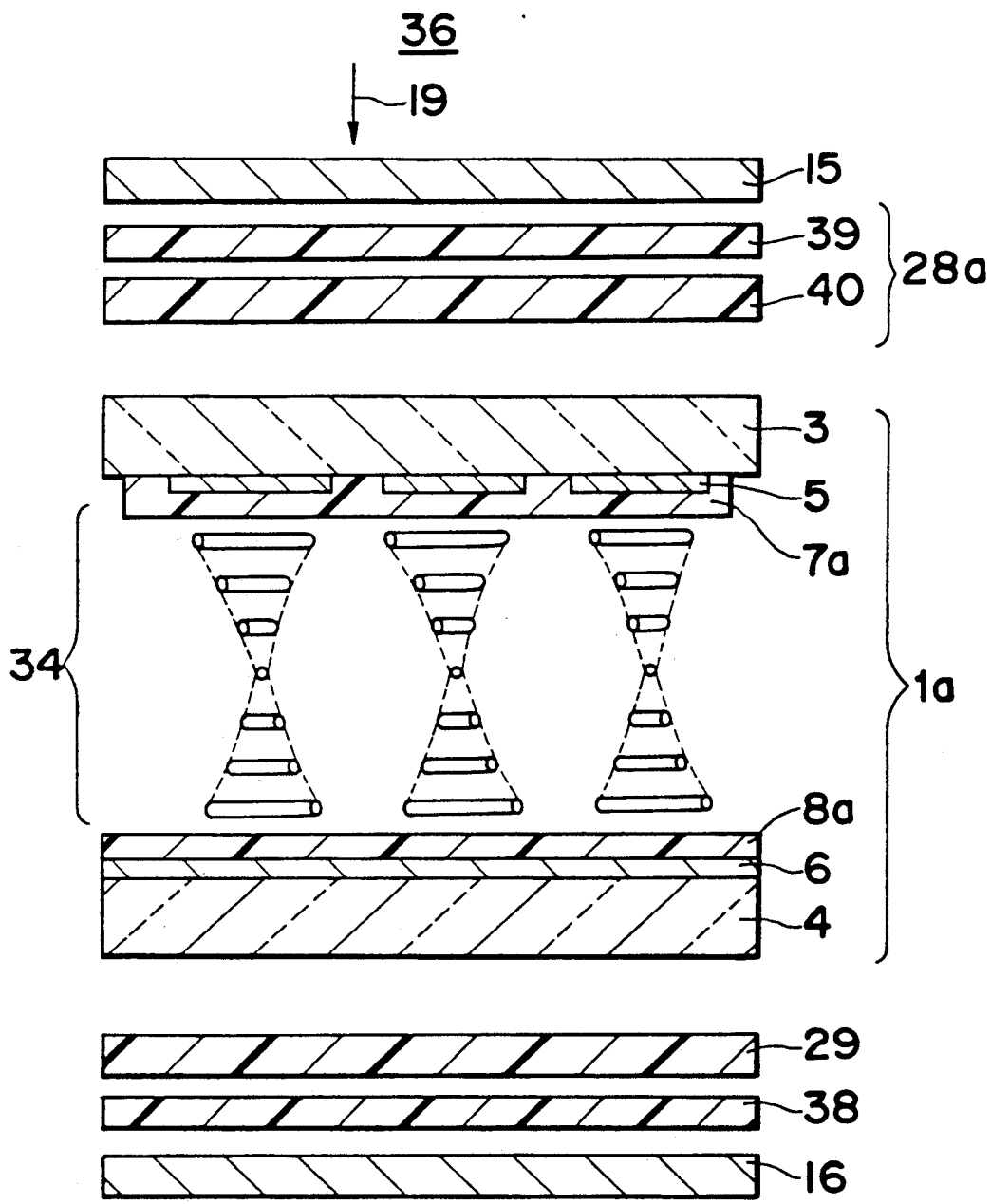
FIG. 19 is an exploded cross sectional view showing a liquid crystal display device of a fourth preferred embodiment according to the present invention.

FIG. 19 is an exploded cross sectional view of a liquid crystal display device 36 of a fourth preferred embodiment according to the present invention. In FIG. 19, the components similar to that shown in FIGS. 7, 13 and 16 are indicated by the same numerical references as that shown in FIGS. 7, 13 and 16.

The liquid crystal display device 36 is made as follows.

A display cell layer 1c for displaying an image is made in the manner similar to that of the third preferred embodiment. On respective outer surfaces of the optically transparent substrates 3 and 4, there are formed a phase difference cancellation film 29, and a phase difference cancellation film 28a, which is composed of laminated phase difference cancellation films 39 and 40.

Also, on respective outer surfaces of the phase difference cancellation films 28a and 29, there are formed a pair of polarizers 15 and 16. In the present preferred embodiment, a retardation compensation film 38 according to the present invention is further arranged between the phase difference film 29 and the polarizer 16.

Each of the phase difference cancellation films 39, 40 and 29 is a uniaxially drawn polycarbonate film having a predetermined optical axis, and the retardations thereof are 200 nms, 200 nms and 400 nms, respectively, for the light transmitting in a direction of the normal perpendicular to respective surfaces of the phase difference cancellation films 39, 40 and 29. The retardation compensation film 38 is made of polystyrene. The retardation $(n_a - n_b) \cdot d4$ of the retardation compensation film 38 is 30 nms for the light transmitting in a direction of the normal perpendicular to the surface of the retardation compensation film 38. Further, the retardation $(n_c - n_b) \cdot d4$ thereof is 70 nms for the light transmitting in a direction parallel to the surface thereof.

FIG. 20 shows a relationship among orientation angles of the liquid crystal of the liquid crystal layer 34, respective optical axes of the phase difference cancellation films 39, 40 and 29, the optical axis of the retardation compensation film 38, and respective polarization axes of the polarizers 15 and 16, when viewed in the direction perpendicular to respective surfaces of the optically transparent substrates 3 and 4 of the liquid crystal display device 36 shown in FIG. 19.

As shown in FIG. 20, the principal axes of the liquid crystal molecules of the liquid crystal layer 34, which are arranged on the side of the optically transparent substrate 4, are parallel to a direction as indicated by an arrow a4 which is rotated by an angle of 60° from the direction of 6 o'clock toward the direction of 9 o'clock. Further, the principal axes thereof which are arranged on the side of the optically transparent substrate 3, are parallel to a direction as indicated by an arrow a3, which is rotated at an angle of 240° from the direction as indicated by the arrow a4 in the counterclockwise direction.

Also, the direction of the maximum one of the principal refractive indices or the optical axis of the phase difference cancellation film 39 is oriented in a direction as indicated by an arrow a39, which is rotated by an angle of 55° from the direction of 6 o'clock toward the direction of 9 o'clock. Further, the direction of the maximum one of the principal refractive indices or the optical axis of the phase difference cancellation film 40 is oriented in a direction as indicated by an arrow a40, which is rotated by an angle of 25° from the direction of 6 o'clock to the direction of 9 o'clock. Therefore, the direction of the refractive indices of the phase difference films 39 and 40 cross each other at an angle of 30°. Further, the direction of the maximum one of the principal refractive indices of the phase difference film 29 is oriented in a direction as indicated by an arrow a29, which is rotated by an angle of 25° from the direction of 6 o'clock toward the direction of 3 o'clock. Furthermore, the polarization direction of the polarizer 15 is oriented in a direction as indicated by an arrow a15, which is rotated by an angle of 40° from the direction of 6 o'clock toward the direction of 9 o'clock. Further, the polarization direction of the polarizer 16 is oriented in a direction as indicated by an arrow a16, which is rotated at an angle of 75° from the direction of 6 o'clock toward the direction of 3 o'clock. Further, the drawing direction or the direction of the aforementioned principal refractive index of $n_a$ of the retardation compensation film 38 is oriented in a direction as indicated by an arrow a38, which is parallel to the polarization direction a16 of the polarizer 16.

Figure 21A:
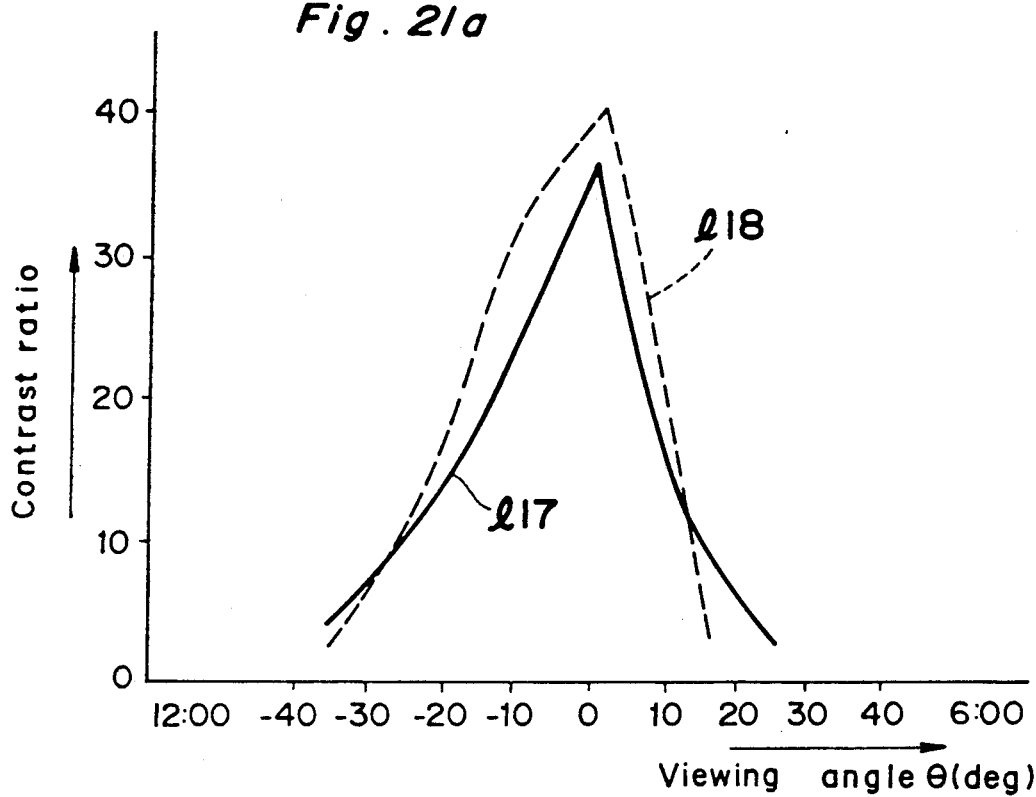
FIGS. 21a and 21b are graphs showing contrast ratio characteristics on the viewing angle of the liquid crystal display device shown in FIG. 19 and the conventional liquid crystal display device shown in FIG. 6.
Figure 21B:
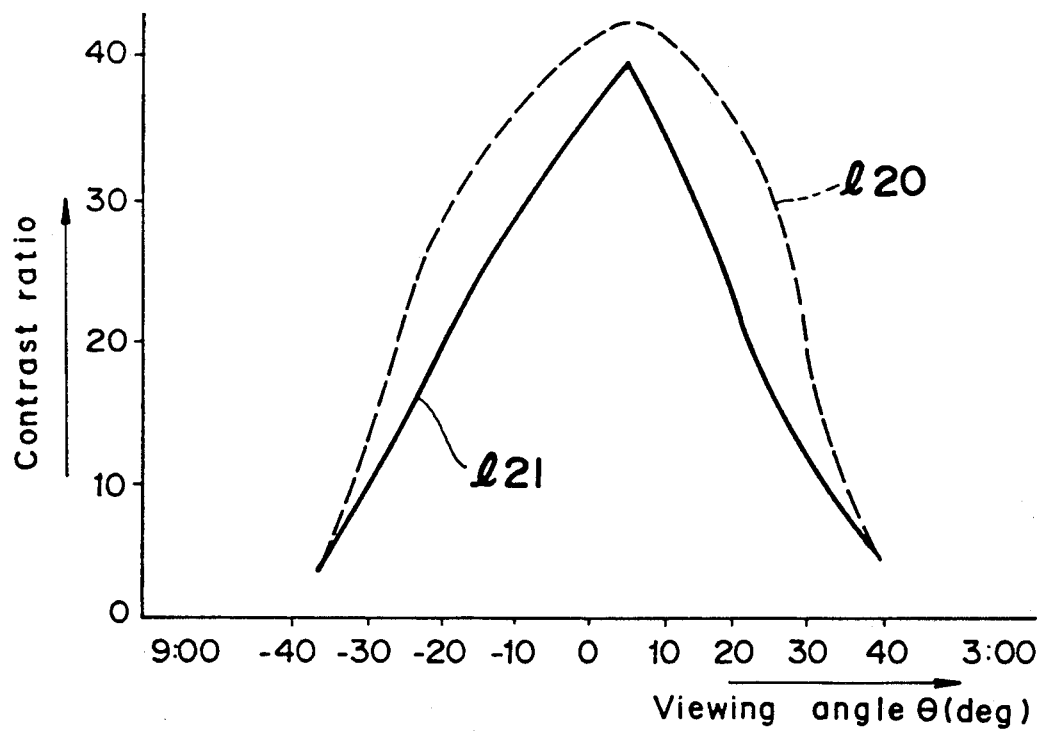

FIGS. 21a and 21b are graphs showing contrast ratio characteristics on the viewing angle of the liquid crystal display device 36. In FIG. 21a, a characteristic curve 119 shows a contrast ratio characteristic on the viewing angle when viewed from a plane including the aforementioned directions of 6 o'clock and 12 o'clock perpendicular to respective surfaces of the optically transparent substrates 3 and 4 of the liquid crystal display device 36. Further a characteristic curve 118 shows the same characteristic of the conventional liquid crystal display device 26 shown in FIG. 6. In FIG. 21b, a characteristic curve 121 shows the same characteristic of the liquid crystal display device 36 when viewed from a plane including the aforementioned directions of 3 o'clock and 9 o'clock. Further, a characteristic curve 120 shows the same characteristic of the conventional liquid crystal display device 26.

As is apparent from FIGS. 21a and 21b, it is understood that the viewing angle characteristic in the directions of 6 o'clock and 12 o'clock is improved as compared with that of the liquid crystal display device 33 of the third preferred embodiment. Further, in the case of a contrast ratio of five, the range of the viewing angle in the directions thereof is enlarged by an angle equal to or larger than 10°, as compared with that of the conventional liquid crystal display device 26. Thus, when the phase difference cancellation film 28a is composed of laminated plural phase difference cancellation films, the contrast ratio is heightened, resulting in a distinct monochromatic display such as a white and black display.

As described above, the retardation compensation film having the optical birefringence, wherein the direction of the maximum one of the principal refractive indices becomes substantially parallel to the direction of the normal perpendicular to respective surfaces of the optically transparent substrates of the display cell layer for displaying an image thereon, can be made of a film obtained by shaping a polymeric liquid crystal material or an ionic liquid crystal material into a film configuration. Alternatively, it can be made of a polymer film wherein the bias of the distribution density of electrons thereof is produced in the direction of the thickness thereof, such as polystyrene.

In such a retardation compensation film or the second cell layer 2, generally, the retardation for the light transmitting in the direction perpendicular to respective surfaces of the substrates of the liquid crystal display cell layer or in the direction of thickness of the retardation compensation film increases as the viewing angle increases. The sum of a change in the retardation caused when light passes through the first cell layer 1 or the display cell layer, and a change in the retardation of the second cell layer 2 or the retardation compensation film is preferably set so as not to change depending on the viewing angle. When such a retardation compensation film or the second cell layer 2 is overlapped on the first cell layer 1 or the display cell layer for displaying an image thereon, the phase difference caused in light passing through the first cell layer 1 or the display cell layer is canceled so as to attain a liquid crystal display having viewing angle characteristics without inversion of the graduation. Thus, the quality of the display thereof can be improved.

As described in the aforementioned preferred embodiments according to the present invention, in both of the normally white display method and the normally black display method, the peak value Tθpeak of the light transmittance can be canceled by arranging the second cell layer 2 for compensating a change in the retardation, the retardation compensation films 30, 35 or 38, or the like, resulting in improved viewing angle characteristics.

Furthermore, the present invention can be suitably applied to an active drive type liquid crystal display device or the like for driving a liquid crystal display cell by using active devices such as Thin Film Transistors, Metal Insulator Metal devices, diodes.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A liquid crystal display device comprising:
   a display cell for displaying an image thereon, said display cell including a liquid crystal layer arranged between a pair of optically transparent substrates, wherein liquid crystal molecules of the liquid crystal layer are twisted by at least 90 degrees;
   a pair of polarizers arranged on respective outer surfaces of said display cell; and
   retardation compensation layer having an optical birefringence for compensating a change in retardation caused when light passes through said display cell so as to improve viewing angle characteristics, said retardation compensation layer being arranged on at least one side and in a direction of the thickness of said display cell, and between said pair of polarizers, wherein
   a direction of a maximum one of principal refractive indices of said retardation compensation layer is oriented in a direction substantially parallel to a direction of a normal, perpendicular to surfaces of the pair of optically transparent substrates of said display cell.

2. The liquid crystal display device as claimed in claim 1,
   wherein said retardation compensation layer includes another liquid crystal layer arranged between another pair of optically transparent substrates, and liquid crystal molecules are arranged in said liquid crystal layer of said retardation compensation layer so that the principal axes of said molecules thereof are substantially perpendicular to respective surfaces of said pair of optically transparent 3. The liquid crystal display device as claimed in claim 2,
   wherein the retardation $\Delta n1 \cdot d1$, which is the product of the birefringence $\Delta n1$ and the thickness d1 of the liquid crystal layer of said display cell, and the retardation $\Delta n2 \cdot d2$, which is the product of the birefringence $\Delta n2$ and the thickness d2 of the liquid crystal layer of said retardation compensation layer, are set so as to fall within the following ranges:

$0.3 \ \mu ms < \Delta n1 \cdot d1 < 0.6 \ \mu ms$, and $0.05 \ \mu ms < \Delta n2 \cdot d2 < 0.3 \ \mu ms$.

4. The liquid crystal display device as claimed in claim 1,
   wherein said retardation compensation layer is made by shaping a polymeric liquid crystal material, comprising liquid crystal molecules having principal axes parallel in a predetermined direction, into a film configuration, and
   said retardation compensation layer is arranged so that the principal axes of the liquid crystal molecules of said polymer liquid crystal material are substantially perpendicular to respective surfaces of said pair of optically transparent substrates.

5. A liquid crystal display device as claimed in claim 1, wherein
   polarization axis of said polarizers cross each other at a right angle.

6. The liquid crystal display device as claimed in claim 1,
   wherein said display cell is a twisted nematic type liquid crystal device.

7. The liquid crystal display device as claimed in claim 1,
   wherein said display cell is a super twisted nematic type liquid crystal device.

8. A liquid crystal display device comprising:
   a display cell for displaying an image thereon, said display cell including a liquid crystal layer arranged between a pair of first and second optically transparent substrates, wherein liquid crystal molecules of the liquid crystal layer are twisted by at least 90 degrees;
   first and second polarizers arranged on sides of respective outer surfaces of said display cell;
   first and second phase difference cancellation films for canceling a phase difference between ordinary light and extraordinary light generated by an optical birefringence of said display cell, said first phase difference cancellation film being arranged between said first optically transparent substrate and said first polarizer, said second phase difference cancellation film being arranged between said second optically transparent substrate and said second substrate; and
   retardation compensation layer having an optical birefringence for compensating a change in retardation caused when light passes through said display cell so as to improve viewing angle characteristics, said retardation compensation layer being arranged on at least one side and in a direction of the thickness of said display cell, and between said first and second said polarizers, wherein
   a direction of a maximum one of principal refractive indices of said retardation compensation layer is oriented in a direction substantially parallel to a direction of a normal, perpendicular to surfaces of the pair of first and second optically transparent substrates of said display cell.

9. The liquid crystal display device as claimed in claim 8, wherein said retardation compensation layer is arranged between said second phase difference cancellation film and said second polarizer.

10. The liquid crystal display device as claimed in claim 8, wherein said display cell is a twisted nematic type liquid crystal device.

11. The liquid crystal display device as claimed in claim 8, wherein said display cell is a super twisted nematic type liquid crystal device.

12. The liquid crystal display device as claim in claim 11, wherein liquid crystal molecules of said liquid crystal layer are twisted at an angle of 240° between the pair of first and second optically transparent substrates.

13. The liquid crystal display device as claimed in claim 8, wherein at least one of said first and second phase difference cancellation films is composed of laminated plural phase difference cancellation films.

14. The device as claimed in claim 1, wherein said retardation compensation layer is an optical film.

15. The device as claimed in claim 14, wherein said optical film is a polystyrene film.

16. The device as claimed in claim 8, wherein said retardation compensation layer is an optical film.

17. The device as claimed in claim 16, wherein said optical film is a polystyrene film.

* * * * *

UNITED STATES PATENT AND TRADEMARK OFFICE
CERTIFICATE OF CORRECTION

PATENT NO. : 5,124,824
DATED : June 23, 1992
INVENTOR(S) : Shyuichi KOZAKI et al.

It is certified that error appears in the above-identified patent and that said Letters Patent is hereby corrected as shown below:

On the title page, in box (73), please change the assignee from "Mitsubishi Denki Kabushiki Kaisha" to --Sharp Kabushiki Kaisha--.

On the title page, in box (75), please change the first inventor's name from "Shuichi Kozaki" to --Shyuichi Kozaki--.

Signed and Sealed this

Twenty-seventh Day of June, 1995

Attest:

BRUCE LEHMAN

Attesting Officer　　　Commissioner of Patents and Trademarks